US012724398B2

(12) United States Patent
Wickramarachchi

(10) Patent No.: US 12,724,398 B2
(45) Date of Patent: Sep. 1, 2026

(54) METHODS FOR ESTIMATING COMPONENT WEAR

(71) Applicant: Element Six (UK) Limited, Oxfordshire (GB)

(72) Inventor: Chandula Tamari Wickramarachchi, Sheffield (GB)

(73) Assignee: Element Six (UK) Limited, Oxfordshire (GB)

( * ) Notice: Subject to any disclaimer, the term of this patent is extended or adjusted under 35 U.S.C. 154(b) by 306 days.

(21) Appl. No.: 18/556,476

(22) PCT Filed: Feb. 3, 2022

(86) PCT No.: PCT/EP2022/052593

§ 371 (c)(1),
(2) Date: Oct. 20, 2023

(87) PCT Pub. No.: WO2022/233461

PCT Pub. Date: Nov. 10, 2022

(65) Prior Publication Data

US 2024/0201651 A1 Jun. 20, 2024

(30) Foreign Application Priority Data

May 7, 2021 (GB) ...................................... 2106562

(51) Int. Cl.
*G05B 19/4065* (2006.01)

(52) U.S. Cl.
CPC .................... *G05B 19/4065* (2013.01); *G05B 2219/37256* (2013.01)

(58) Field of Classification Search
None
See application file for complete search history.

(56) References Cited

U.S. PATENT DOCUMENTS

| | | | | |
|---|---|---|---|---|
| 5,852,793 | A | 12/1998 | Board et al. | |
| 9,846,978 | B1 * | 12/2017 | Tseng | G07C 5/006 |
| 2007/0088550 | A1 * | 4/2007 | Filev | G05B 23/0221 704/245 |
| 2008/0161959 | A1 * | 7/2008 | Jerard | G05B 19/4065 700/110 |
| 2009/0326890 | A1 * | 12/2009 | Shetty | G05B 23/0245 703/7 |

(Continued)

FOREIGN PATENT DOCUMENTS

| | | | |
|---|---|---|---|
| CN | 106944877 | A | 7/2017 |
| CN | 110647943 | A | 1/2020 |

(Continued)

OTHER PUBLICATIONS

Ying Liao & Yisha Xiang & Min Wang, "Health assessment and prognostics based on higher-order hidden semi-Markov models," Feb. 12, 2020, arXiv:2002.05272, pp. 1-29. (Year: 2020).*

(Continued)

*Primary Examiner* — Ariel Mercado-Vargas
(74) *Attorney, Agent, or Firm* — Armstrong Teasdale LLP

(57) ABSTRACT

This disclosure relates to a computer-implemented method for estimating component wear. At least one clustering analysis may be applied to measurements taken during component use to identify clusters and generate alerts.

16 Claims, 23 Drawing Sheets

(56) References Cited

U.S. PATENT DOCUMENTS

| | | | | |
|---|---|---|---|---|
| 2014/0156225 | A1* | 6/2014 | Dagnino | G01M 99/00 702/183 |
| 2016/0091393 | A1* | 3/2016 | Liao | G01M 13/00 702/34 |
| 2017/0365109 | A1* | 12/2017 | Tseng | G07C 5/008 |
| 2018/0272491 | A1 | 9/2018 | Yang et al. | |
| 2019/0064768 | A1* | 2/2019 | Tanaka | G05B 19/4065 |
| 2019/0152011 | A1 | 5/2019 | Kummari et al. | |
| 2019/0339165 | A1* | 11/2019 | Finn | G01N 21/9515 |
| 2020/0391884 | A1* | 12/2020 | Hawley | G07C 5/085 |

FOREIGN PATENT DOCUMENTS

| | | | |
|---|---|---|---|
| CN | 111337250 | A | 6/2020 |
| EP | 2937241 | A1 | 10/2015 |
| EP | 3001265 | A1 | 3/2016 |
| EP | 3783347 | A1 | 2/2021 |
| JP | 2015209205 | A | 11/2005 |
| JP | 2012523621 | A | 10/2012 |
| JP | 2020177378 | A | 10/2020 |
| KR | 20090053002 | A | 5/2009 |
| WO | 2010117889 | A2 | 10/2010 |

OTHER PUBLICATIONS

Laio, Y et al. "Health Assessment and Prognostics Based on Higher Order Hidden Semi-Markov Models", Naval Research Logistics (NRL) 68(2): 259-276 (2021).

Ma, B. et al., 'Machinery Early Fault Detection Based on Dirichlet Process Mixture Model', IEEE Access, 7: 89226-89233 (2019) See particularly Section II and table V.

Combined Search and Examination Report issued for Application No. GB2201383.3, dated Aug. 3, 2022 (8 pages).

Search Report and Written Opinion issued for International Application No. PCT/EP2022/052593, dated May 24, 2022 (13 pages).

Assaf, R. et al. "Unsupervised learning for improving fault detection in complex systems," 2017 IEEE International Conference on Advanced Intelligent Mechatronics (AIM) Jul. 3, 2017 (pp. 1058-1064).

Yu Jinsong et al., "Tool-wear on-line estimation using a Dirichlet process mixture model", Chinese Journal of Scientific Instrument, vol. 38, No. 3, Mar. 2017, pp. 689-694.

* cited by examiner

METHODS FOR ESTIMATING COMPONENT WEAR

CROSS-REFERENCE TO RELATED APPLICATIONS

This application is a § 371 national stage of International Application No. PCT/EP2022/052593, filed Feb. 3, 2022, which claims priority to Great Britain Application No. 2106562.8, filed May 7, 2021.

FIELD OF THE INVENTION

The present invention relates to computer-implemented methods for estimating component wear. At least one lustering analysis may be applied to measurements taken during component use to identify clusters and generate alerts.

BACKGROUND

As components of machinery are used, portions of the component wear. Wear may include degradation or change in shape of the component, most often located at a surface in contact with another part of the machine or in contact with an external surface. Wear can be chemical, mechanical, or both, and can be exacerbated by conditions surrounding the contact such as pressure, temperature, and lubrication.

Wear leads to the need for components to be inspected and replaced, because continuing to use a worn component is inefficient and can be unsafe.

In a vehicle, for example, commonly replaced parts include windscreen wiper blades, filters, brake pads, tires, belts, and cylinders. All of these components are susceptible to frictional and thermal wear. Wear of any one of these components makes the vehicle less safe to drive, both because the component will be less effective when worn (for example, worn brake pads will provide poorer stopping capabilities) and because ultimate failure of the component removes key functionality from the vehicle (e.g., failed windscreen wiper blades providing no visibility for the driver in poor conditions).

Wear is also detrimental in a machining process, for example metal cutting, in which material is removed in the form of swarf, to create a net shape through the relative movement between a tool and a workpiece. Indeed, one of the most significant yet unavoidable challenges in machining is the continuous wear on tools. In this case, tool wear is the loss of material from the cutting surface due to interactions between the tool and the workpiece. Tool wear is known to cause many issues to machined components, including form and dimension discrepancies, vibrations, and chatter, as well as insufficient surface finishes.

Machining with a worn or damaged tool will lead to surface defects on the component and crack propagation over time, resulting in non-acceptance or early retirement of that component. As a result, when machining safety critical components, industry employs a time-based maintenance strategy and discards tools at set times regardless of wear state. Typically, a tool could be retired with 50-80% of useful life remaining.

It can be challenging to assess component wear during use because the component may be inaccessible and/or moving such that a visual inspection would not provide useful results. In the example of a vehicle, inspection of the wear on the brake pads may necessitate removal of the wheels; a task the average vehicle user may not be capable of undertaking. Belts, and other internal engine components, may be even harder to inspect.

Accessibility may also be a challenge in machining. Attempting to inspect a component such as a tool in use for machining has the additional drawback that the tool must be taken out of use while the inspection takes place. During the design and testing phase of a tool, designers may opt for off-line wear measurement in a run-to-failure method. This approach interrupts the cutting process intermittently and requires the temporary removal of the tool from the machine to complete wear measurements using optical microscopy. This is a time consuming and expensive method, that also introduces confounding influences to the process such as positional differences between the tool in a first machining cycle and in a second machining cycle. Positional differences may affect the cutting conditions and thus wear progression can vary for machining cycles of the same time period.

FIG. 1 shows a typical breakdown of the time spent in different states by a tool during its lifetime. Less than half of the lifetime of this exemplary typical tool is spent machining, with the rest of its lifetime spent idle either due to workpiece measurement or tool measurement taking place.

TCM aims to move the industry focus from a preventative approach to a predictive maintenance strategy in order to reduce waste. To improve the process efficiency, a TCM system should ideally aid the reduction of time spent on measurements to increase machining time.

Supervised machine learning can be used to aid TCM techniques. As with any supervised learning technique, a model can be built using data relating to a number of previously used tools, with the model attempting to define relationships between measured degradation of the previously used tools and characteristics of the tools. For example, a simple model produced by a supervised learning technique may find and define a relationship between machining time to failure and tool diameter, workpiece hardness, and tool revolutions per minute (rpm). Such a TCM technique could then, for a new tool, predict time to failure using tool diameter, workpiece hardness, and tool revolutions per minute (rpm) as input parameters to the machine learning derived model. It remains the case that TCM can be inaccurate owing to the complex nature of machining, varying operating conditions, and the availability of descriptive labels of wear states.

There exists a need for improved estimation of component wear to reduce component downtime and improve safety.

SUMMARY

The invention is defined by the appended independent claims. Embodiments of the invention are defined in the dependent claims.

In a first aspect, there is provided a computer-implemented method for estimating component wear, comprising: performing a first clustering analysis on a first plurality of measurements to identify one or more clusters in the first measurements, wherein the first measurements comprise measurements of a parameter of the component taken during use of the component; and generating an alert when a new cluster is identified in the first measurements.

In this way, the method provides an estimation of component wear by highlighting when there has been a significant enough change in the measured parameter to warrant a new cluster being identified.

The method uses measurements taken during use of the relevant component, thereby avoiding the deleterious effects associated with using a test component or relying on data relating to components other than that in use. The method is therefore more accurate, because it does not rely on an assumption that the component in use wears in a similar manner to those used to establish or train a wear model, for example a trained classifier. Wear progression of components can vary wildly, depending on the category of component and the conditions at the time of its use, but also on properties that cannot be easily measured or predicted accurately due to their random nature, for example inclusions and microstructure. Relying on an assumption of uniform tool characteristics can therefore lead to reduced accuracy of estimation of wear. In contrast, the method of the invention uses current data, measured from the specific tool of which the wear needs to be estimated. A more accurate estimate of component wear can be used to reduce component downtime, by avoiding unnecessary inspection, increase safety, by indicating that inspection is required when other estimates may not have so indicated, and reduce the wasted life remaining on tools at the point when they are discarded.

A clustering analysis, performed during use of the tool and updated as new measurements are taken, is advantageous because components often exhibit significant changes in their behaviour when certain levels of wear are reached. For example, the appearance of a crack in a machining tool, or the beginning of fray in a drive belt, may lead to a change in acoustic emission from the component, forces around the component, or temperature generated at friction zones contacting the component. A clustering analysis can identify such shifts in the measurements. Furthermore, a clustering analysis is advantageous over implementing a simple threshold measurement value at which an alert may be generated, because a threshold-based alert would be more susceptible to triggering by outliers. For example, a very brief spike (for example a single measurement) in temperature between a drive belt and sprocket could be caused by a factor not related to belt wear (e.g., debris entering and swiftly leaving the friction zone). A clustering analysis may not consider this outlier to be the beginning of a new cluster, and thus not generate an alert leading to unnecessary inspection, maintenance, or component waste.

The generation of an alert may be an alert to a controller of the component and/or associated machinery to cease operation in preparation for an inspection or as a safety measure. The generation of an alert may also include an auditory or visual signal to an operator, or the generation of an alert to be sent to an external device as a notification.

The method may further comprise: performing a second clustering analysis on a second plurality of measurements to identify one or more clusters in the second measurements, wherein the second measurements comprise measurements of the parameter of the component, taken after the alert has been generated and during further use of the component; and generating an alert when a new cluster is identified in the second measurements.

After an alert has been generated and the component inspected a first time, the component may be deemed fit for further use and placed back into its associated machinery. During further use, a second clustering analysis is performed in the same manner as the first clustering analysis, generating an alert in the same way. The second clustering analysis benefits from the same advantages as the first clustering analysis.

The method may further comprise: continuing the first clustering analysis on the first measurements, and introducing the second measurements to the first clustering analysis, to identify one or more clusters in the combined first and second measurements; and generating an alert when a new cluster is identified in the combined first and second measurements.

There are advantages associated with both operating a clustering analysis across the lifetime of the component (a global analysis) and also with operating a clustering analysis using measurements only since its most recent removal from its associated machinery, for example in an inspection (a local analysis). Trends in a global analysis may provide a more accurate estimate of overall component wear, i.e., an estimation of the remaining life of the component. This is due to the clustering analysis having access to measurements of the component in more varied conditions, including when new, and over a longer time span. A global analysis may, however, be less sensitive to changes in component behaviour which are significant on a local scale, perhaps significant enough to warrant an inspection, but not as significant in the context of the entire life of the component. In particular, if a positional difference after an inspection leads to measurements taken after the inspection being highly distinct from measurements taken prior to the inspection, a global analysis will be especially insensitive to important changes in wear characteristics manifesting in the measurements.

Operating parallel global and local analyses, both of which provide alerts on indication of a new cluster, therefore provides a fuller estimate of component wear. The alerts generated by the first and second clustering analyses may be distinct from one another, in that they may be distinguishable either by a controller or an operator. For example, if a local analysis is used to monitor for when inspections are necessary, the alert may be a notification to the operator to recommend inspection. The alert generated by the global analysis may be a notification both to the operator and to a manager that the tool is nearing end of life.

The first clustering analysis may be referred to herein as a global clustering analysis and the second clustering analysis may be referred to herein as a local clustering analysis. It will be appreciated that while only two parallel analyses are described (one including lifetime measurements, the other measurements since last inspection), any number of parallel analyses could be performed according to embodiments of the invention. For example, a clustering analysis based on measurements between a component's second and fifth inspections may be undertaken.

The first and/or second clustering analyses may be performed by an unsupervised machine learning algorithm, and may not pre-define a number of clusters to determine during the analysis.

In this way, the estimation of tool wear is, again, made more accurate because the method is not reliant on a manually selected number of clusters, which may not reflect the behaviour of the component in use. A pre-defined number of clusters instructs the clustering analyses how many clusters they must place the data points (in this case, measurements), into. This number could be determined based on the number of clusters which led to an effective and accurate estimation for a similar component used previously. However, this suffers from the same issues described above in relation to differences, sometimes imperceivable differences, between components which can limit the accuracy of predictions based on prior knowledge.

The unsupervised machine learning algorithm may be a Dirichlet process mixture model (DPMM). The properties of a DPMM have been found to be particularly suited to estimating component wear, particularly when a global and a local DPMM are performed in parallel.

The alert may be a recommendation to perform component inspection.

The parameter of the component may be one or more of: a temperature of the component; a force on the component; and an acoustic emission from the component. In this way, i.e., by taking measurements of parameters other than a direct measurement of the wear itself, measurement can take place during use of the component. Removal of the component from its associated machinery can thus be avoided, thereby reducing idle time for the component and removing the possibility of repositioning errors.

The parameter may be an acoustic emission from the component, and the first and/or second clustering analysis may use a plurality of adjacent frequency ranges as candidate features.

Acoustic emission has been found to be a particularly effective parameter to measure when analysing the measured data with clustering analyses. While the unsupervised clustering analyses advantageously do not rely on a model trained on training data, and optionally do not have a pre-defined number of clusters, it can be advantageous to provide some guidance relating to candidate features for the algorithm. A candidate feature is the variable of interest to the algorithm, so, in the case of an unsupervised clustering algorithm, the candidate feature is the variable to which the data points to be clustered relate. Frequency bins are an effective candidate feature when the variable in question is acoustic emission of a component.

The component may be a machining tool. It will be appreciated that, although, in a preferred embodiment, the component is a machining tool, that the methods for estimating component wear described herein are suitable and advantageous for any component of machinery. In particular, any component of machinery which, in use, produces a parameter suitable for indirect measurement, including but not limited to temperature, acoustics, force, pressure, any wavelength of light, and so on. Examples relating to vehicle componentry have also been given, but are also not limiting.

Associated machinery, as referred to herein, may therefore include the workpiece, robotic control componentry, motors, and so on; the components other than the tool itself which are used to machine the workpiece. In the previous vehicle example, if the component is a drive belt, the associated machinery may include driven components such as an alternator or pump, sprockets on which the belts are mounted, and so on.

Each frequency range may correspond to a pre-determined harmonic of chip formation in the tool, optionally each frequency range may be a 4 kHz interval. Chip formation is a particularly relevant factor when the component in question is a machining tool, since high sliding distances and rpm of machining tools leave them especially susceptible to chip or crack formation. By using frequency ranges based on chip harmonics, new clusters will be more likely to be identified when a new harmonic of chip formation is reached, i.e., when it becomes increasingly likely that a chip will form.

In a second aspect, there is provided, a method for inspecting component wear, comprising: performing the computer-implemented method according to the first aspect; and in response to an alert output from the computer-implemented method, inspecting the component for wear.

In a third aspect, there is provided a data processing apparatus comprising means for carrying out the steps of the first aspect. A data processing apparatus may be any processing means capable or configured to carry out the steps of the methods described herein. The data processing apparatus may be a single processing unit, a distributed system with a wired connection, or a distributed system with a wireless connection. Alternatively, the data processing apparatus may be hosting a cloud server on which the analysis takes place.

In a fourth aspect, there is provided a computer program comprising instructions which, when executed by a computer, cause the computer to carry out the steps of the first aspect. The computer program may be, for example, a mobile application configured to operate on a mobile device.

In a fifth aspect, there is provided a computer-readable storage medium comprising instructions which, when executed by a computer, cause the computer to carry out the steps of the first aspect.

BRIEF DESCRIPTION OF THE DRAWINGS

The present invention may be more completely understood when considered in conjunction with the attached drawings, in which like reference characters designate the same or similar components throughout the several views, and in which.

DETAILED DESCRIPTION

Figure 1:
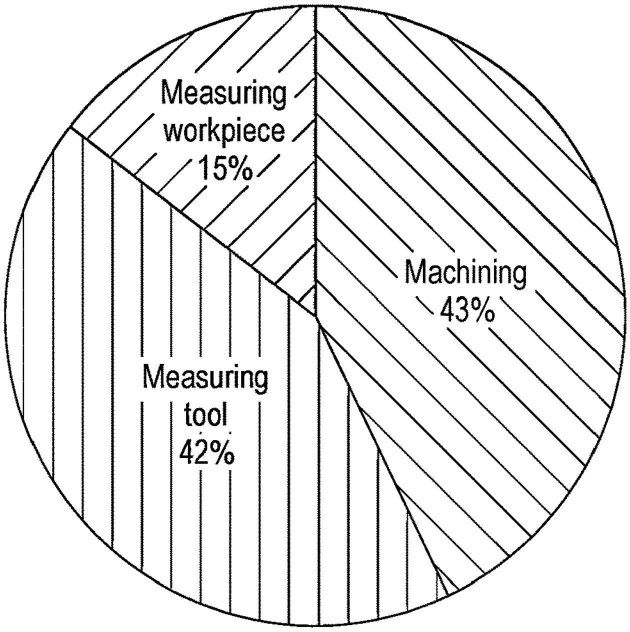
FIG. 1 depicts a breakdown of time spent on a typical tool wear test setup.

In order to demonstrate and explain embodiments of the present invention, a detailed example is presented in the field of machining. In this example, the component is a machining tool, and the measured parameter is acoustic emission. It will be appreciated that this is exemplary only, and that methods and systems according to embodiments of the invention are applicable to any number of fields in which components wear through use, exposure, or by any other means. Similarly, parameters other than acoustic emissions, measured during use of the component and preferably indirectly so as not to interrupt said use, can be used as input data for a clustering algorithm as described.

For example, a clustering analysis may be performed on temperature measurements taken in the vicinity of a fan (a component) in a desktop computer (associated machinery). A clustering algorithm as described in further detail herein could be applied to the temperature measurements and an alert generated when a new cluster is identified therein. The alert could prompt replacement or inspection of the fan, for example.

Now described is a realistic TCM system using Dirichlet process mixture models (DPMMs), capable of dealing with confounding influences whilst retaining accuracy for inference over previously unseen tools (an unseen tool is usually either a new tool that has not been used for machining or a tool that has not been directly measured to obtain measurements of tool wear). The resulting system could, therefore, be more versatile than previous attempts which could allow for easier implementation in industry.

An unsupervised clustering approach using Dirichlet process mixture models to detect the change in characteristics of a cutting process online for diagnosis is used. As well as providing a useful monitoring tool, this approach has the potential to reduce the need for exhaustive wear measurements associated required for prognosis. The model is well suited to the erratic and unpredictable nature of tool wear progression, as the number of clusters required to determine the possible damage states are not set a priori. Consequently, this method is equipped to handle variations across homogeneous and heterogeneous groups of tool material compositions.

The proposed approach is demonstrated here as a method to reduce the time required for trials for wear characterisation of new tools. In the example shown, the results indicate that the approach would result in around a 30% reduction of test times (on average) during outer diameter turning of case-hardened steel, across 10 Polycrystalline cubic Boron Nitride tools from two different material compositions.

The ability to monitor and predict tool deterioration during machining is an important goal because the state of wear has a significant influence on the surface quality of machined components. To build up a comprehensive condition monitoring system for diagnosis and prognosis, however, extensive measurements and knowledge of tool wear is required. Collecting labelled datasets that include damage information for this purpose can be expensive and time consuming.

In this work, DPMMs are used as an unsupervised method to detect characteristic changes in the data for online damage detection. The inventors apply DPMMs to an acoustic emission (AE) dataset, collected during a turning operation. DPMMs allow clustering as data are collected without the need to set the number of possible clusters a-priori, alleviating the need for an in-depth prior knowledge of the machining process. The need for pre-labelled training data is also eliminated, reducing the costs associated with data collection.

This work addresses the issues related to confounding influences introduced by fluctuating operations during trials by using two DPMMs in parallel. The intention here was that a new cluster initiation would be used to prompt an intervention, i.e., a manual inspection of the tool. As a result, it was hoped that the number of interruptions to the process could be reduced. The aim was to increase the time spent on machining and reduce the time spent on tool measurement. By tracking the characteristics of the data through time, another goal was to stop the machining process prior to failure, and reduce the number of early tool disposals. Although not covered in this work, it may be possible to adopt a semi-supervised approach by adding damage labels to the model, reducing the number of false positives.

The Dirichlet Process

DPMMs are used across numerous areas of research for clustering data. In the field of natural languages processing, the study of translation and text generation has led researchers to use DPMMs for clustering verbs. The technique is applied to organise and predict words. In medical research, DPMMs have been used to classify brain tissue from magnetic resonance imaging (MRI) scans. Though GMMs perform effectively for well-defined tissue types, by not having to set number of clusters a-priori in DPMMs, researchers were able to classify abnormal brain data.

An introduction to Dirichlet process Gaussian mixture models is given in this section, where a Gaussian is used as the base distribution.

DPMMs can be used to cluster Gaussian and non-Gaussian data. The DPMM can be seen as an Infinite Gaussian Mixture Model (IGMM), where a mixture of Gaussian distributions are used to cluster the data. Here, the number of Gaussian distributions employed can tend to infinity, allowing the modelling of any non-Gaussian datasets; a cloud of data that does not follow a Gaussian distribution can be split into an infinite number of small clusters that are, themselves, Gaussian. IGMMs can also be used to learn information about the probability of each data point belonging to each cluster. The idea is to find clusters within the data whilst also finding the parameters (size, shape) and the labels for those clusters (cluster 1, . . . , cluster n). It is not possible to find the labels and the parameters of the clusters in one step, and so, Gibbs sampling is used in this work to infer the joint distribution. It is not a requirement for the DPMM to have knowledge of the number of clusters that may exist within the data before the algorithm is applied; the Gibbs sampler is able to initiate new clusters if data already evaluated by the algorithm is sufficiently different to the current data point.

The generative model of the DPMM is shown in equations (1a) to (1e). In Gaussian mixture models, an assumption is made where each data point $x_i$ (i=1, . . . , N, N is the number of data points) is sampled from a Gaussian distribution (equation (1a)), a cluster of data with label $c_i$.

For each Gaussian distribution, the conjugate prior is used (Normal Inverse-Wishart (NIW) distribution over the mean (equation (1b)) and the covariance (equation (1c)) with hyperparameters, ($\mu_0$, $\Sigma_0$, $\kappa_0$, $\nu_0$) to achieve a closed form solution for the posterior. The data is normalised and the prior cluster has a zero mean and unit variance Gaussian in this work.

$$x_i|c_i \sim N\left(\mu_{c_i}, \sum_{c_i}\right) \tag{1a}$$

$$\mu_{c_i} \left| \sum_{c_i}, C_i \sim N\left(\mu_{c_i}|\mu_0, \frac{\sum_{c_i}}{\kappa_0}\right)\right. \tag{1b}$$

$$\sum_{c_i} \left| c_i \sim IW\left(\sum_{c_i} \left| \sum_0, \nu_0\right.\right)\right. \tag{1c}$$

$$c_i \,|\, \pi \sim Mult(\pi) \tag{1d}$$

$$\pi \sim Dir(a) \tag{1e}$$

The cluster labels are sampled from a multinomial distribution (equation (1d)). The mixing proportion, π, is the probability of data belonging to each cluster. In order to calculate these probabilities, the Dirichlet distribution is used as it is the conjugate prior to the multinomial distribution (equation (1e)). π is controlled by the strength parameter α, the Dirichlet process prior (α may also be referred to as a scaling or scale parameter). The scaling parameter α determines the probability with which a new cluster will be identified; i.e., the chance of a new cluster being identified for a new data point, rather than the new data point being assigned to an existing cluster, is proportional to α.

Ultimately, the aim of this process is to find the posterior distribution over the cluster labels, from which the most likely label could be chosen. It is very difficult to find the probability of all cluster labels given all data (equation (2)) as it is not possible to simultaneously sample each cluster to find the cluster parameters ($\mu_{cj}$, $\Sigma_{cj}$) whilst also finding the mixing proportion of all clusters.

$$p(c|X) \tag{2}$$

Figure 2:
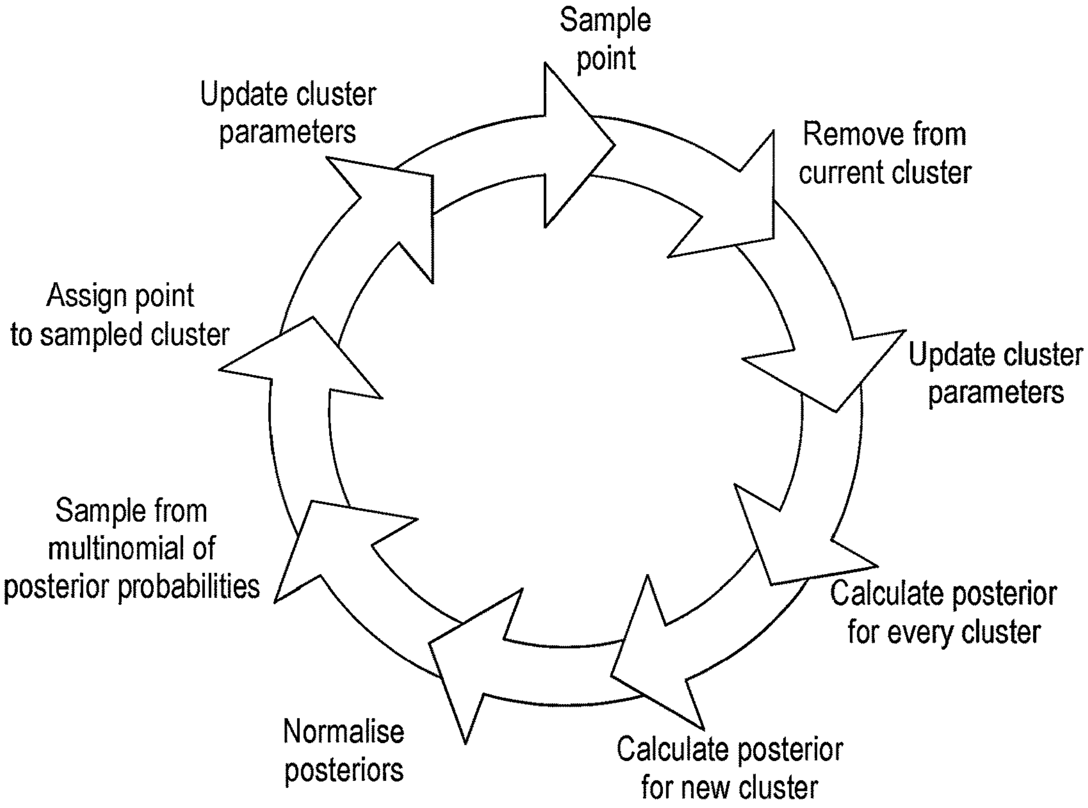
FIG. 2 depicts a process of Gibbs sampling.

The collapsed Gibbs sampler can be implemented to solve this. The collapsed Gibbs sampler sequentially samples new sets of cluster parameters based on samples of labels and new sets of labels based on parameters (equation (3)). FIG. 2 shows the steps followed by the Gibbs sampler. Each of these sampling steps can be done in closed form because of the selection of conjugate priors. In other words, it is a valid Markov chain Monte Carlo method that finds the distribution over the cluster labels and the distribution over the cluster parameters sequentially. The collapsed Gibbs sampler is performed over a window of data, the length of which is specified according to available computation power.

$$p(c_i|x_i, X_{-i}, c_{-i}) \tag{3}$$

Equation (3) is the first probability distribution of interest. It is the probability that point $x_i$ has the cluster label $c_i$ given the model has seen all data $X_{-i}$, all other clusters $c_{-i}$ and the new data point. This posterior probability has a multinomial distribution. Here, −i means all the data points except for the data point i.

To compute this, the Gibbs sampler assigns the data randomly to clusters, and removes data points sequentially to update the cluster parameters and find the cluster best suited for that data point. The prior likelihood of drawing data from an existing cluster (k=1, . . . K) can be found in equation (4), where $N_{-i,k}$ is the number of data points in the current class and N is the total number of data points once the one being considered has been removed.

$$p(c_i = k|c_{-i}, a) = \frac{N_{-i,k}}{N + a - 1} \tag{4}$$

The prior for a new cluster (k*) is calculated using equation (5).

$$p(c_i = k^*|c_{-i}, a) = \frac{a}{N + a - 1} \tag{5}$$

The posterior predictive likelihood of the point belonging to each cluster should now be calculated, which is the probability of assigning the current data point to cluster k, given the value of the data, the current cluster the data is in, all the data already in that cluster and some hyperparameters.

To calculate the likelihood of the DPMM, equation (6) is used, referred to as the posterior predictive distribution. This states the likelihood that the data point was generated by the cluster defined by the posterior distribution over the parameters, where $D_k$ is all the data the algorithm has seen in a given cluster. For the DPMM model, this is represented by a multivariate-t distribution which has heavier tails than a Gaussian, facilitating smaller clusters to accept new data points.

$$p(x|D_k) \tag{6}$$

The posterior is normalised by the marginal likelihood, i.e. the sum of all the calculated posteriors to ensure it is a valid probability distribution, and to find the multinomial distribution for the cluster label $c_i$ of point i. If the point is assigned to a new cluster, a N I W prior is used to initialise the cluster and the number of clusters are increased by one. This process is repeated until all the data in the window have been reassessed.

There are three main benefits of using this model. Firstly, it does not require an operator to set the number of clusters (or damage states in this case) before using the algorithm, which eliminates the need for prior knowledge of the process that can be impossible to obtain. Secondly, the whole model is controlled by the hyperparameters; hence threshold tuning, and calibration is not required. Thirdly, DPMMs permits the covariance function to change with the input data, resulting in a model that can handle dissimilar datasets which may be useful when detecting damage on multiple tools that wear differently to one another.

Experimental Set-Up

Figure 3:
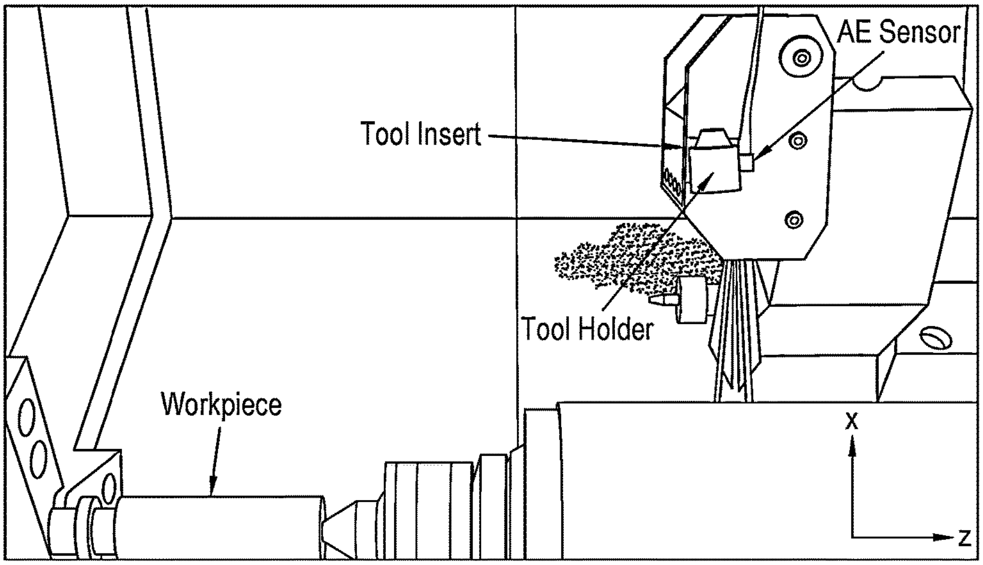
FIG. 3 depicts a machining set up in accordance with an embodiment of the invention.

The test setup used here to explore the uses of the DPMM is shown in FIG. 3 where PcBN tools are used to machine case hardened workpieces until catastrophic failure. These are referred to as 'end of life' tests. As it is not possible to measure tool wear during machining, these tests are sectioned so that four continuous cuts, referred to as passes of the workpiece, are carried out at a time, followed by inspection of the tool. The inspection consists of removing the tool from the machine to measure flank and crater wear using a 2D optical microscope and a 3D scanning microscope respectively. On average, it takes over 8 minutes to complete four passes and associated tool wear measurements. Over 42% of the time spent completing tool wear tests is spent on actions associated with these measurements.

This setup has limitations that must be taken into consideration when choosing a model for TCM. Firstly, removing the tool for measurement is unavoidable as it is the only way to collect damage labels. When a tool is removed, it is not possible to secure it back to its exact position prior to measurement. As a result, the value of depth of cut is uncertain for the next pass. Depth of cut is pivotal to the mechanics of machining; varying the depth of cut can affect the forces, stresses, and dynamics of the process. Secondly, at the aforementioned four pass intervals, the workpiece is replaced by a new one. This is because the case hardening only penetrates a small layer of the workpiece's outer diameter, and is likely to be machined off after four passes.

Here acoustic emissions are measured and a Mistras Micro-30D differential sensor with a sampling rate of 1 MHz is used. This results in a frequency range of 0-500 kHz when taking the Nyquist criteria into account. An Okuma Space Turn lathe LB3000 EXII was used for this experiment. In attempt to gain further insight into the generating mechanisms for the AE, swarf was collected.

AE signals were collected from two different types of tools where the only variation is the material composition, or 'grade' of material; the grade of tool specifies the percentage of cubic boron nitride (cBN) particles within its composition. The grade has a direct effect on the behaviour of the tool, and defines its suitability to a type of machining operation. The two grades used in this work are named Grade A (tools A1-A5) and Grade B (tools B1-B5).

Feature Selection for the DPMM

Figure 4:
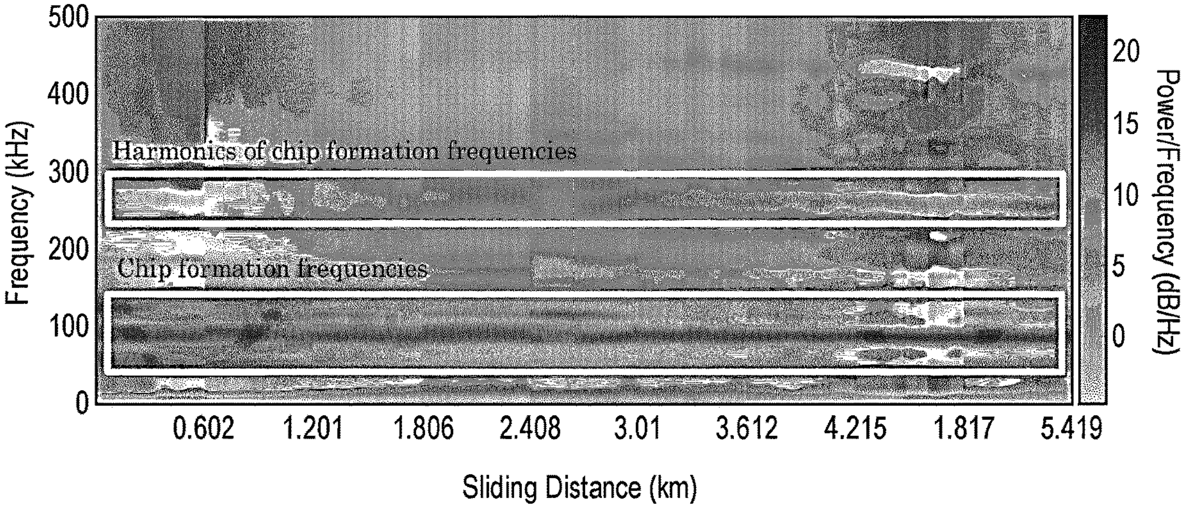
FIG. 4 depicts a spectrogram of a PcBN tool at specific cutting conditions.
Figure 5:
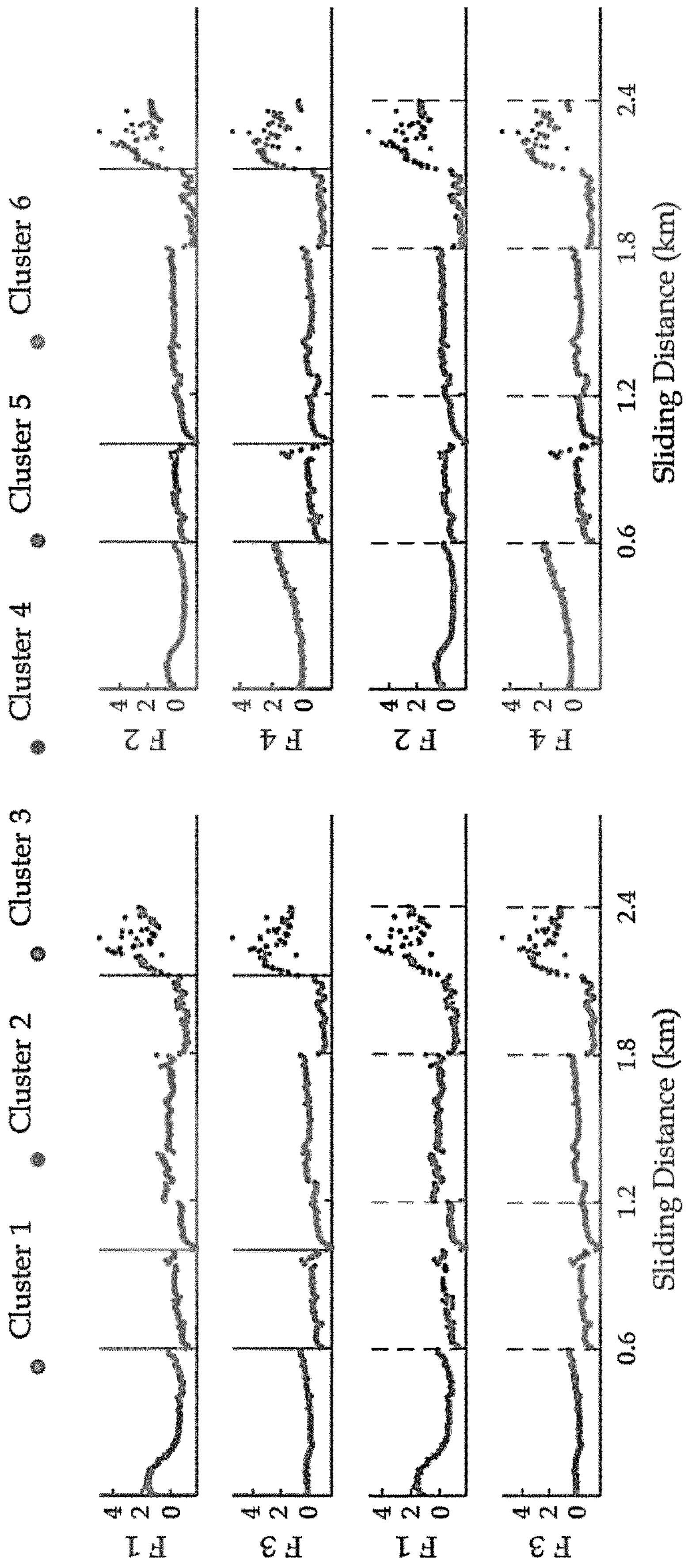
FIG. 5 depicts DPMM clustering results for a test tool, A1, using harmonics of the chip formation frequency from AE as input features.
Figure 6:
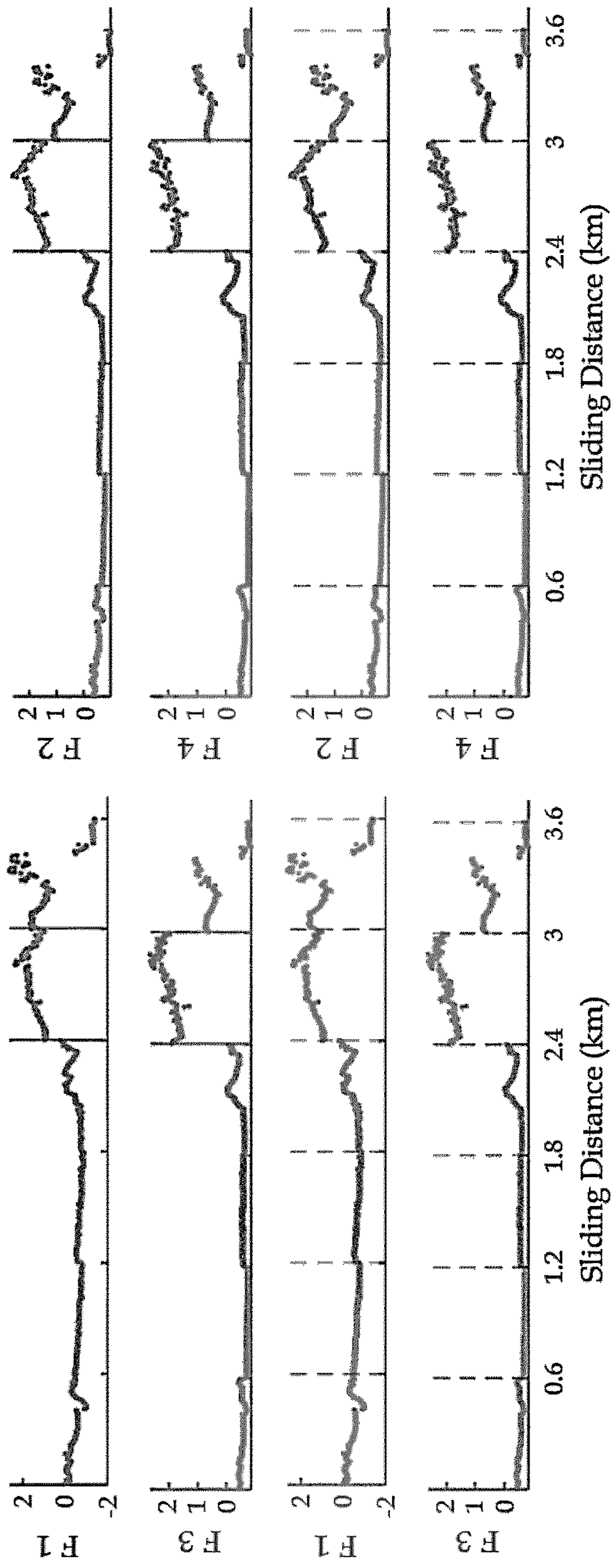
FIG. 6 depicts DPMM clustering results for a test tool, A2, using harmonics of the chip formation frequency from AE as input features.
Figure 7:
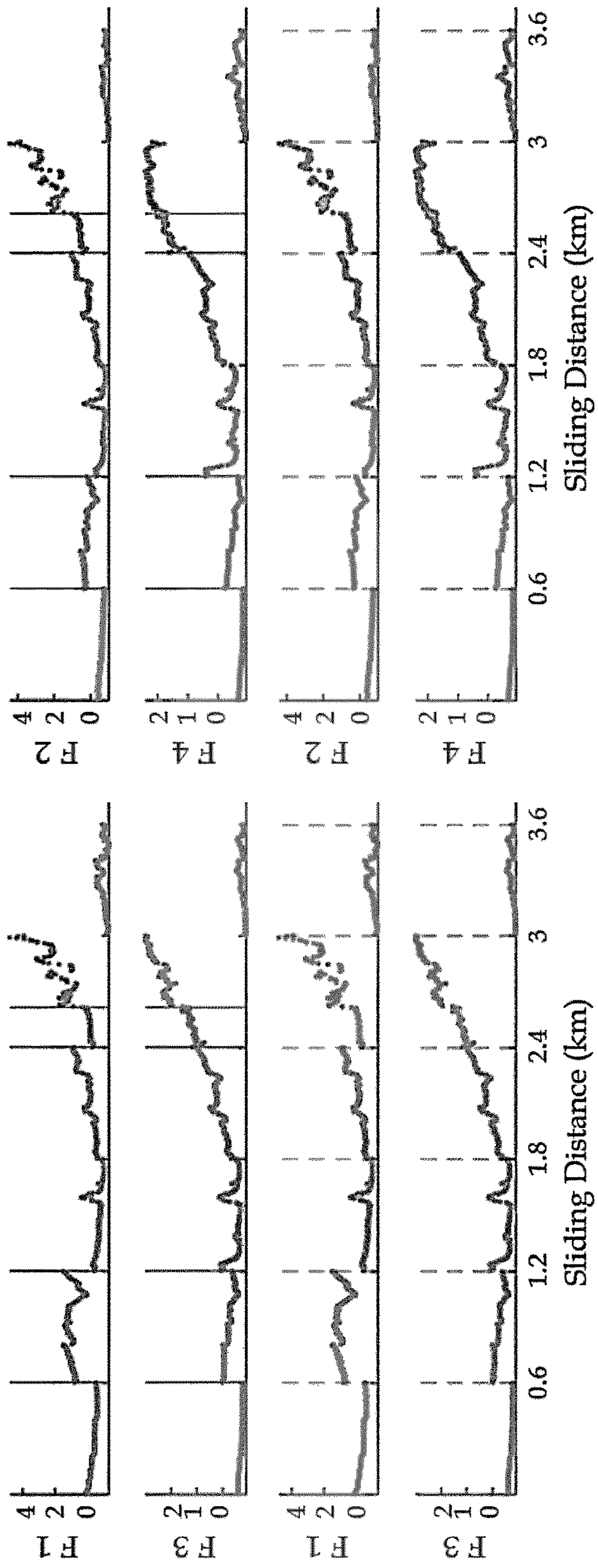
FIG. 7 depicts DPMM clustering results for a test tool, A3, using harmonics of the chip formation frequency from AE as input features.
Figure 8:
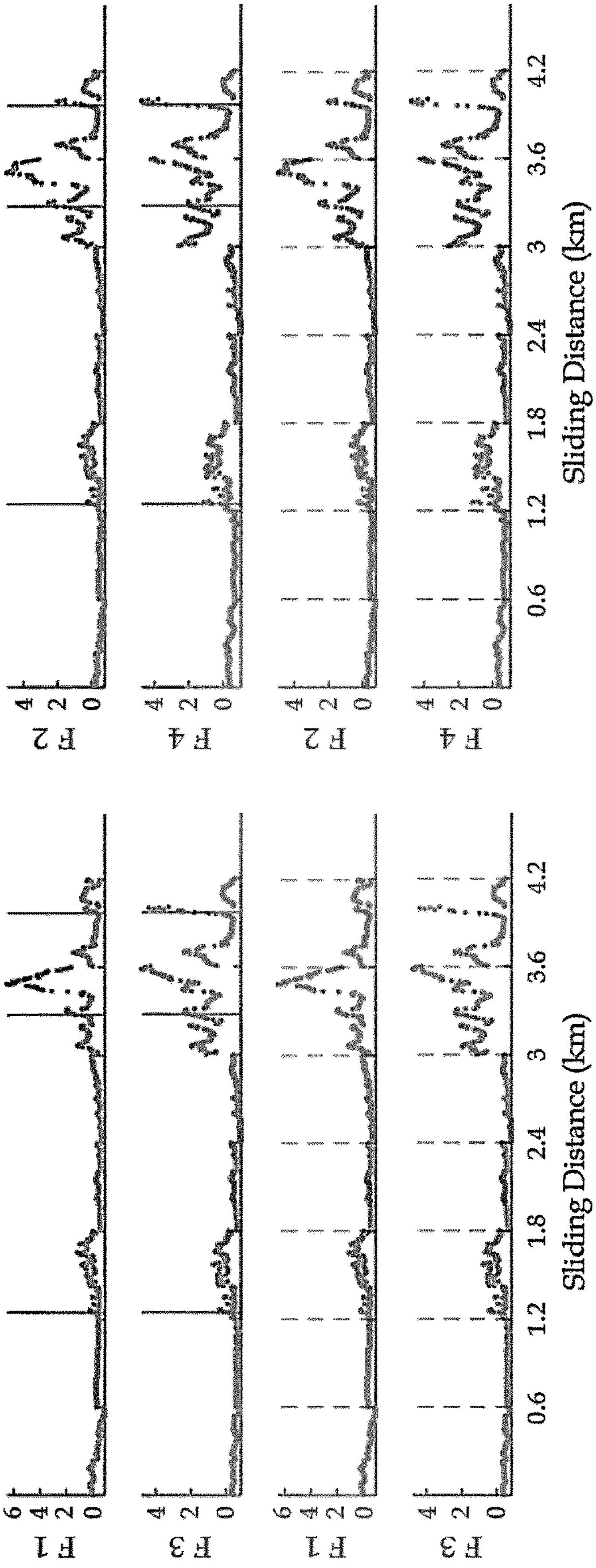
FIG. 8 depicts DPMM clustering results for a test tool, A4, using harmonics of the chip formation frequency from AE as input features.
Figure 9:
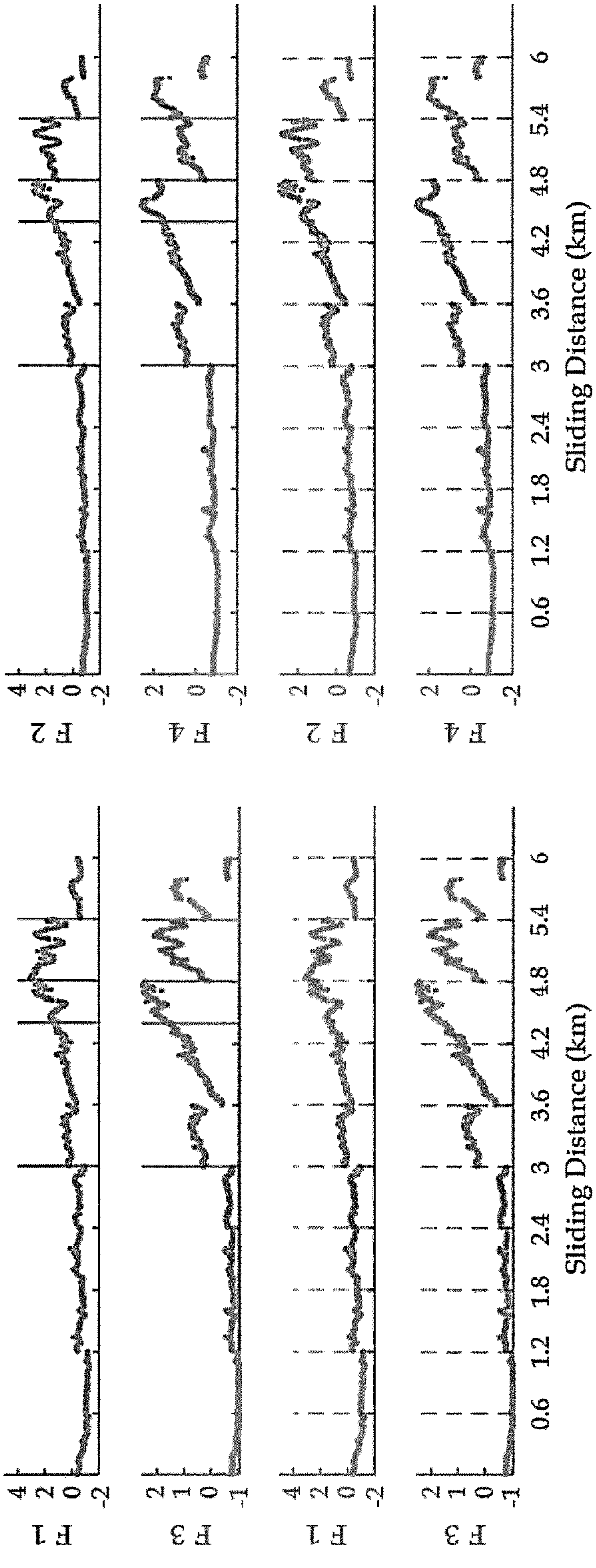
FIG. 9 depicts DPMM clustering results for a test tool, B1, using harmonics of the chip formation frequency from AE as input features.
Figure 10:
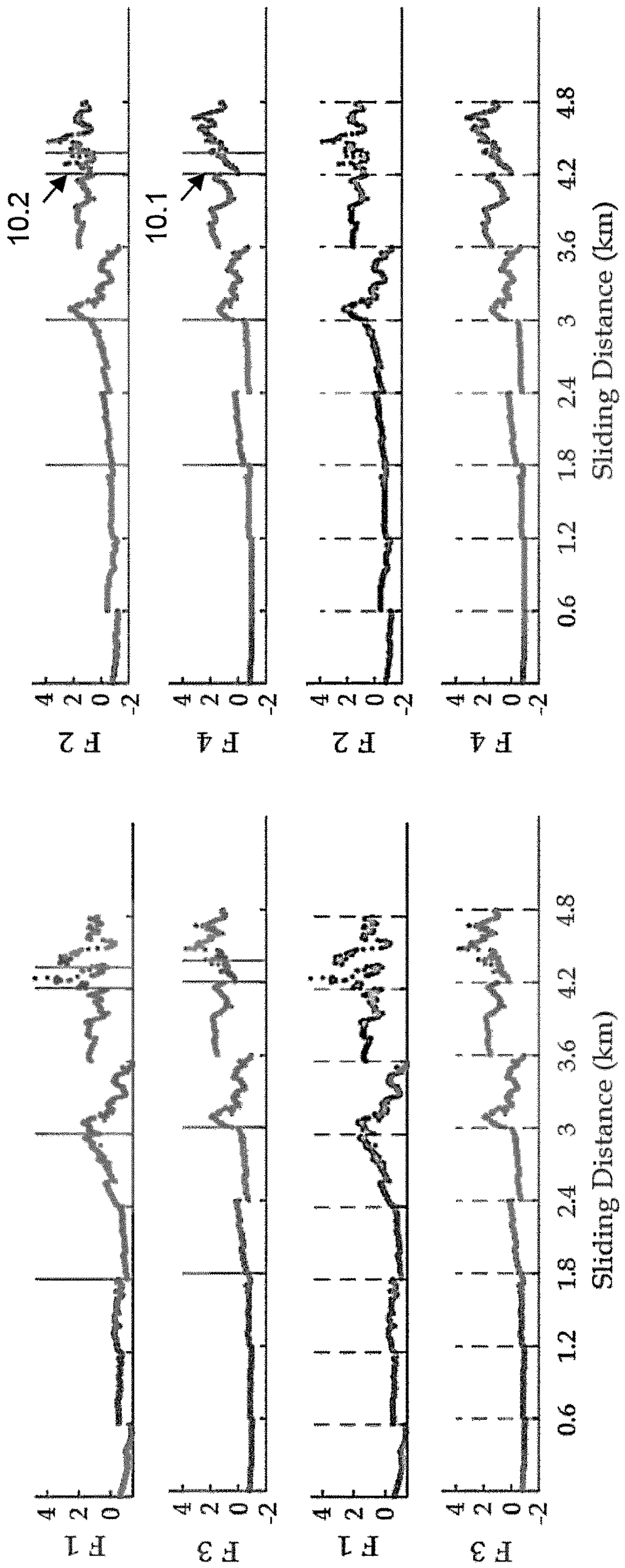
FIG. 10 depicts DPMM clustering results for a test tool, B2, using harmonics of the chip formation frequency from AE as input features.
Figure 11:
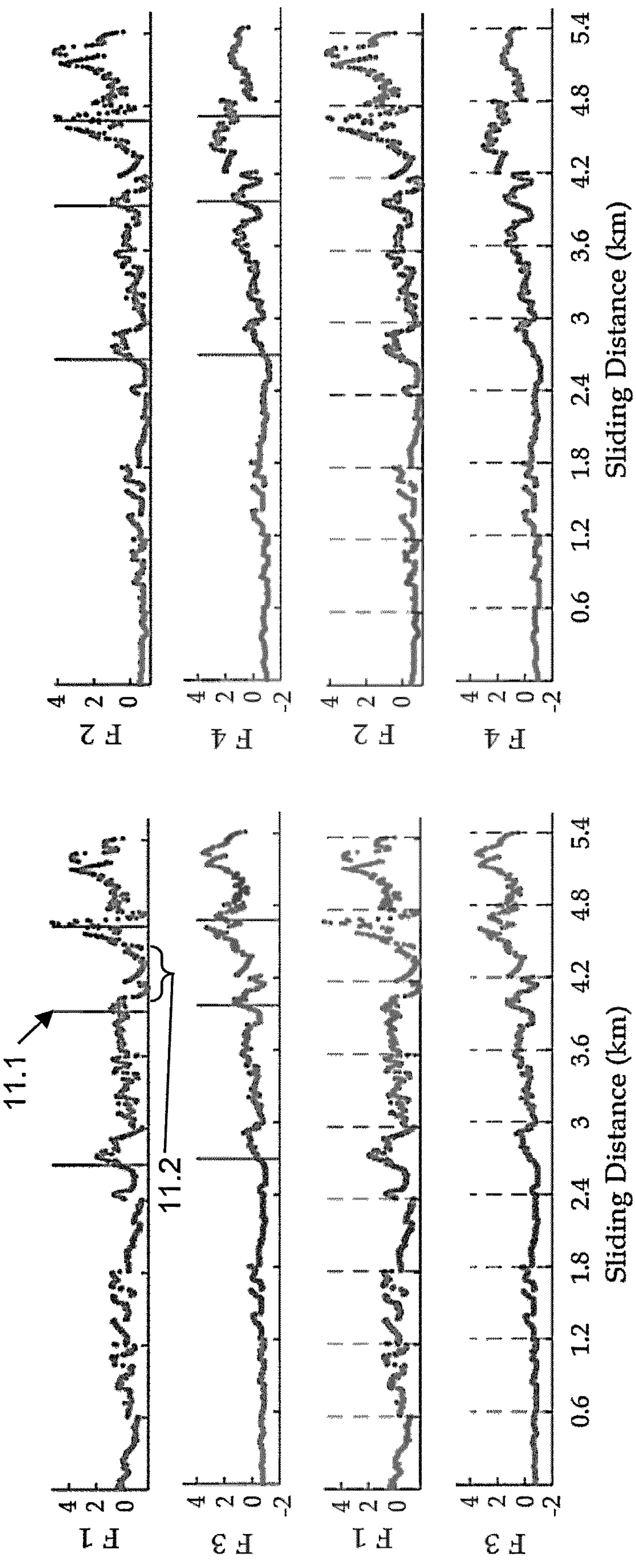
FIG. 11 depicts DPMM clustering results for a test tool, B3, using harmonics of the chip formation frequency from AE as input features.
Figure 12:
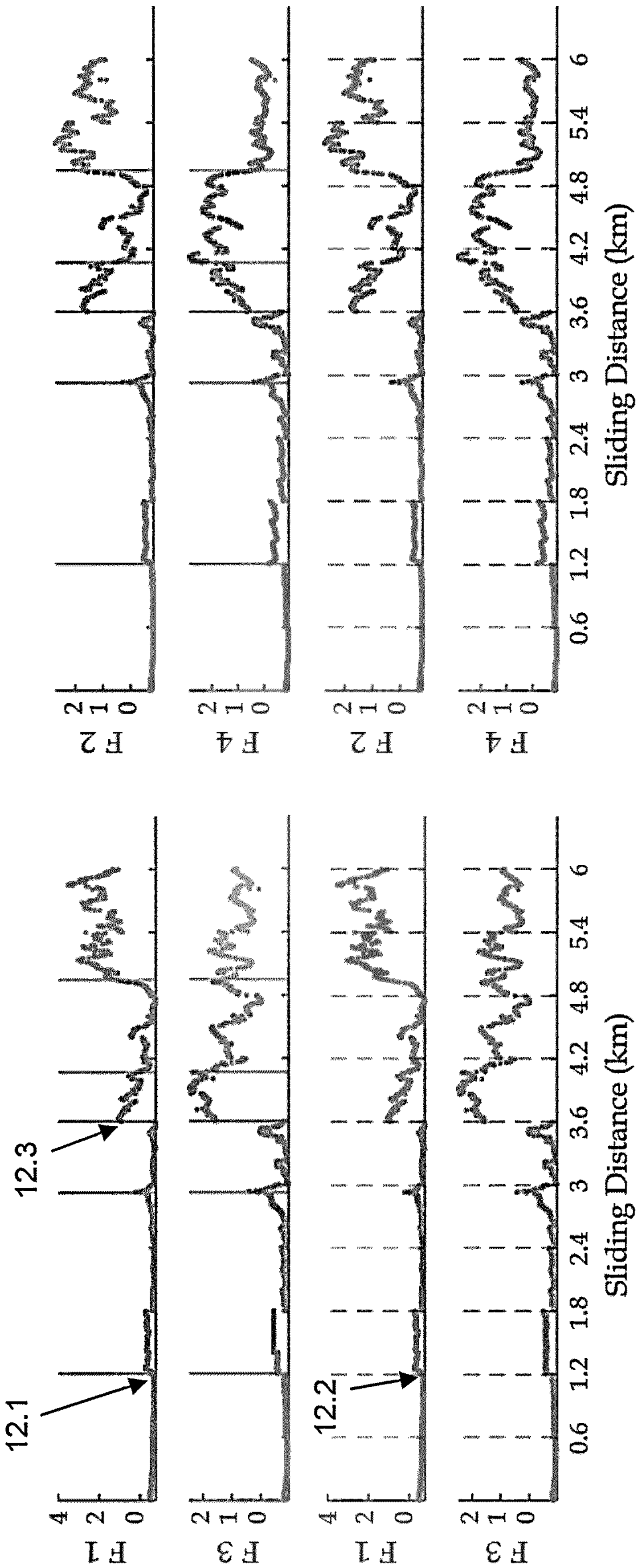
FIG. 12 depicts DPMM clustering results for a test tool, B4, using harmonics of the chip formation frequency from AE as input features.

AE signals can be visualised in the frequency domain as spectrograms. In FIG. 4, a spectrogram for an example tool is displayed as a function of sliding distance, the distance travelled by the tool. In FIG. 4, frequency is plotted in kilohertz on the y-axis, sliding distance is plotted in kilometers on the x-axis, the shading plots the power of the signal as the average power per unit bandwidth in decibels per Hertz. Here, important frequency ranges are highlighted; the frequencies at which saw tooth formation is assumed to occur on the chips (also referred to as chip formation frequencies in this work) and the harmonics of these frequencies, possibly owing to nonlinearities within the system.

Ultimately, DPMMs have the potential to be applied in an industrial setting to cluster data automatically when running online. To achieve this, the input features should behave similarly across a homogeneous set of tools. From the spectrograms it is clear that the power of the harmonics of chip formation frequencies increase in intensity with the progression of tool wear. Subsequently, four frequency bins (in 4 kHz intervals) that carry the harmonics of chip formation frequency (throughout the entire tool life) are chosen as candidate features for each tool grade. It is important to note that prior knowledge of the process is required to identify these features that increase in intensity during the end of tool life. As the process is run online, it is not possible to identify this behaviour a-priori for a new tool. Here, the used frequency bands lessens the requirement on specific prior knowledge, however, identification of these bands is still achieved using preliminary trials for any new tool grade.

It will be appreciated that similar preliminary trials could be performed on any component of machinery in order to determine candidate features. Such preliminary trials need not focus on acoustic emissions, rather they could focus on any measurable parameter as described herein. Furthermore, clustering algorithms as described herein could be performed without using candidate features determined from preliminary trials. For example, arbitrary ranges could be used in an initial use of the component and iteratively refined. By way of example only, if temperature were selected as a parameter to measure during component use, temperature ranges beginning at 50° C. and in 25° C., 50° C., 75° C., or 100° C. increments could be used. Similarly, forces, wavelengths of light emission, and pressures could use Newton, wavelength, and Pascal ranges as candidate features, with or without preliminary testing.

DPMMs in Parallel

The clusters in DPMMs are formed due to change in mean and variance of the input features. In AE generation during machining, these changes of mean and variance are assumed to be caused by the onset of tool wear. However, unavoidable confounding influences, such as the change in workpiece or the positioning of the tool post measurement at the specified intervals, can also cause variations in the AE signal. It is important to differentiate between these two causes of cluster formation when using DPMMs to avoid false positives.

In structural health monitoring (SHM), confounding influences can present themselves as short and long term trends that must be distinguished from damage for accurate prediction. Amongst others, principal component analysis can also be used as a technique when dealing with confounding influences, where principal components with low variance can be used as features that are damage sensitive, yet unimpeded by prominent environmental trends. Though these techniques are successful in suppressing unwanted trends, they require a set of representative training data a-priori.

In this work, it is proposed to account for confounding influences whilst also retaining sensitivity to possible tool damage. It is proposed here to run two DPMMs in parallel:

1. The first DPMM is initiated at the start of each tool test and runs throughout tool life. This DPMM is referred to as the global DPMM henceforth.
2. The second DPMM is initiated at the start of each tool test and is reset at the start of each four passes of the workpiece, i.e. at the point where workpiece changes and tool positioning alterations occur. This DPMM will be named local DPMM.

The next section explores the application of the parallel DPMMs to the dataset described above.

Experimental Results

For each tool, the features are fed into two parallel DPMMs, where the Gibbs sampler is set with a window length of 200 (200 seconds of data), to enable the convergence to the target distribution.

FIGS. 5 to 12 show the results for tools A1-A4 and B1-B4. FIGS. 5 to 8 show parallel clustering for tools A1 to A4, respectively, and FIGS. 9 to 12 show parallel clustering for tools B1 to B4, respectively. Each of these figures contain the results from the global DPMM and from the local DPMM. In all cases, the top four plots relate to the global DPPM and the bottom four plots relate to the local DPMM. The harmonics of the chip formation frequency from acoustic emissions are used as input features F1 to F4, in each case. As mentioned above, features F1 to F4 are frequency 'bins', in this exemplary work they are 4 kHz intervals, carrying the harmonics of chip formation frequency throughout tool life. F1 is the lowest Hz frequency bin and F4 is the highest, and the scale in the y-axis for each feature has been normalised before plotting.

Figure 22:
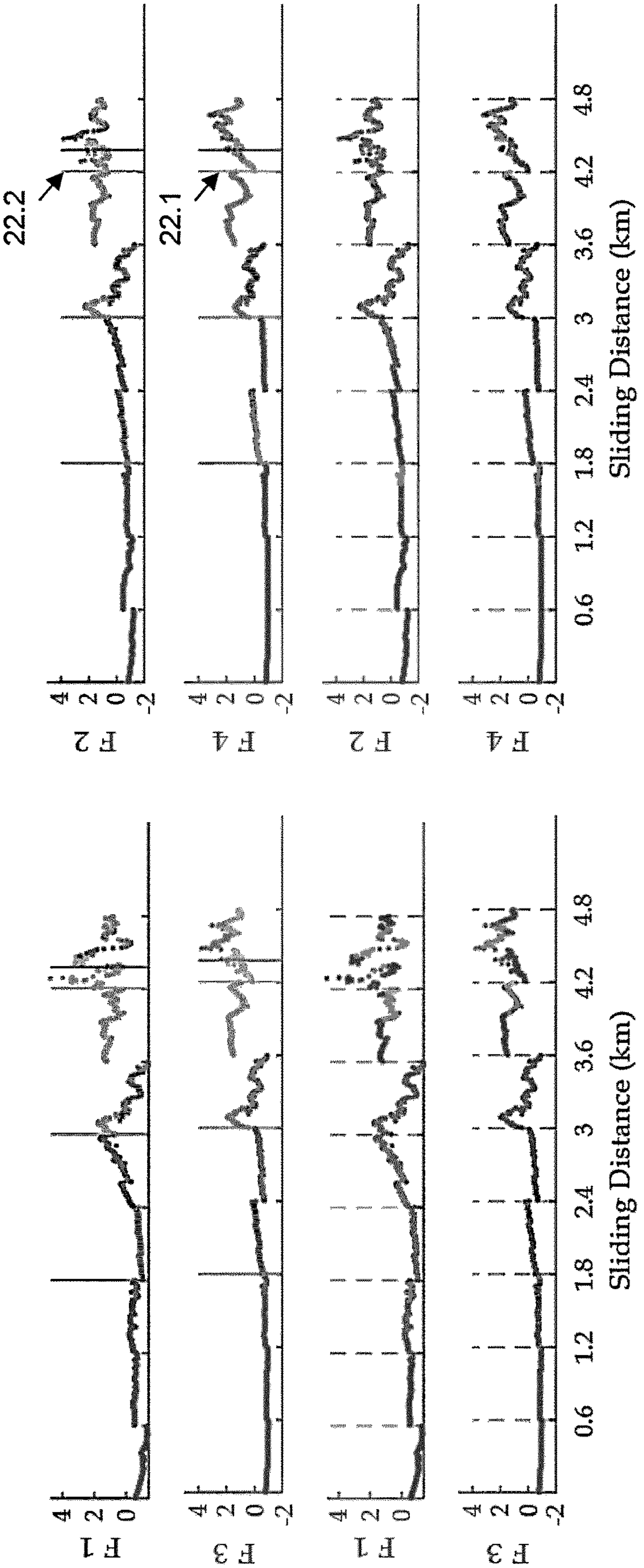
FIG. 22 depicts DPMM clustering results for a test tool, B2, using harmonics of the chip formation frequency from AE as input features.
Figure 23:
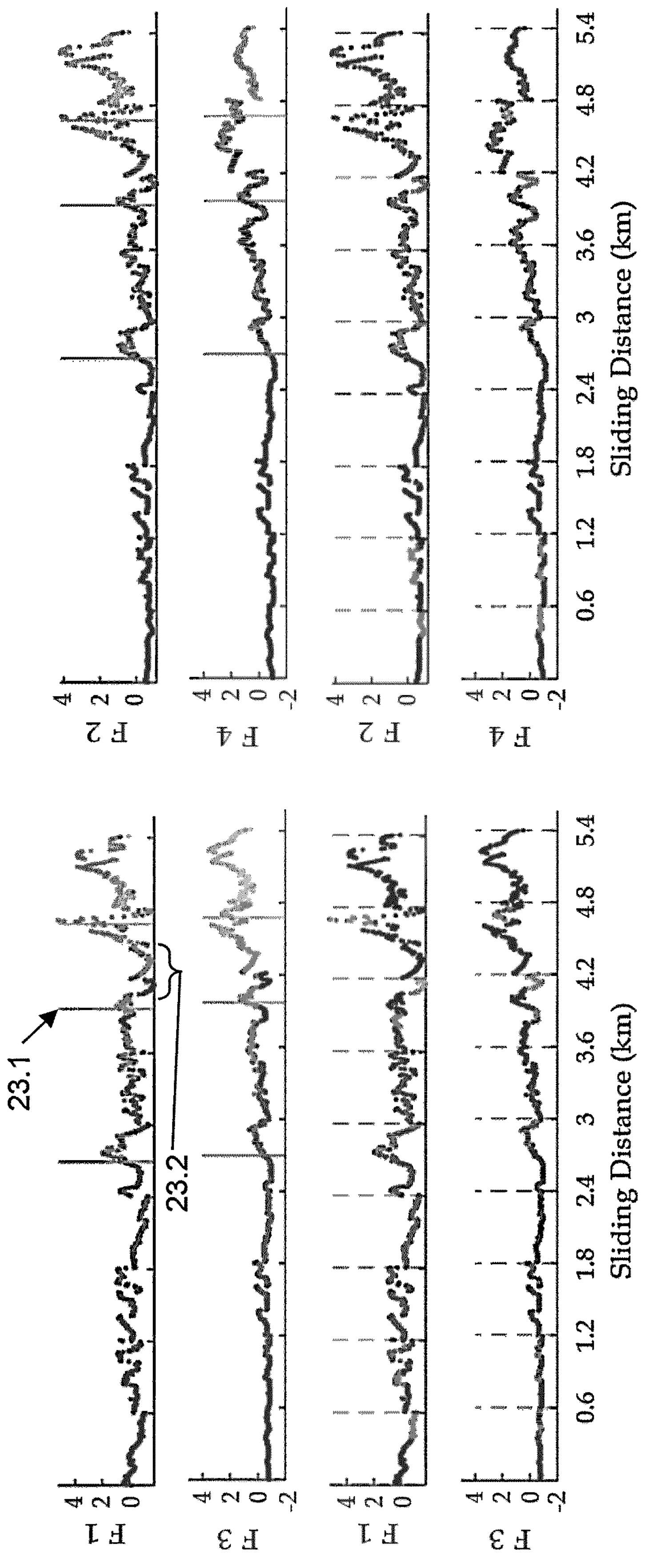
FIG. 23 depicts DPMM clustering results for a test tool, B3, using harmonics of the chip formation frequency from AE as input features.
Figure 24:
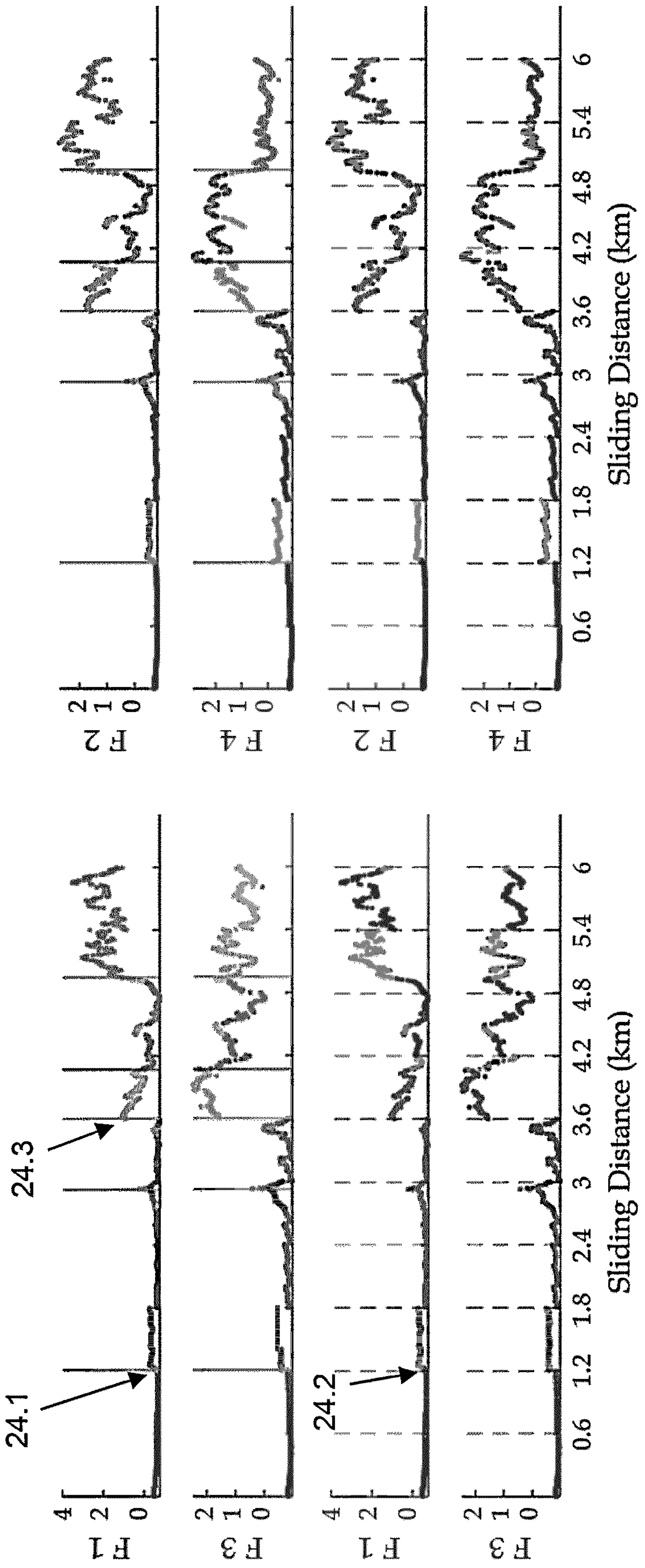
FIG. 24 depicts DPMM clustering results for a test tool, B4, using harmonics of the chip formation frequency from AE as input features.

In the method shown in FIGS. 5 to 14 and 17 to 26, new clusters are identified in both the global and local DPMMs. New clusters in the global DPMMs are identified with vertical lines, but in the local DPMMs are identified with a change in colour. In both cases, when a new cluster is identified for any one of the candidate/input features F1 to F4, the new cluster is initiated for all of the other candidate features. For example, in FIGS. 10 and 22, points of interest 10.1 and 22.1 show that a new global cluster is identified on the basis of data points in the fourth frequency bin (feature F4). Features F1 to F3 are updated on the basis of this identification and begin categorizing data points into the new cluster (see points of interest 10.2 and 22.2), despite perhaps not having met the new cluster identification threshold with their own data points.

Local clusters are homogenized across input features in the same way. Unlike global clusters, however, the local clustering analysis begins anew with every tool inspection. In other words, the local clustering graphs comprise a number of local clustering analyses, each using a data set comprising data points between the vertical dashed lines.

It will be appreciated that this method of applying cluster identification based on one feature to all other features in the relevant DPMM (i.e., within global or within local DPMM) is one possible embodiment, but that other methods are possible in accordance with the invention. Features could be kept entirely separate and a new alert generated from each feature individually. Alternatively, a threshold number of features identifying a new cluster before alert generation could be implemented. Equally, an alert could be generated only when a new cluster is identified for all features. Identifying a new cluster using a clustering analysis, as used herein, is intended to encompass all such options.

In methods according to the present invention, alerts is identified when a new cluster can be identified using any one of the four candidate features in the global.

FIGS. 17 to 26 show the same results as FIGS. 5 to 12, but are presented in colour. Correspondence between the colour and grayscale keys can be derived from the keys in FIGS. 5 and 17.

For the global DPMM results, the clusters are presented in different colours, and the initiation of each cluster is demonstrated with a vertical line with the same colour as the cluster label, where the first cluster is initiated at the arrival of the first data point according to a threshold. The threshold value set here to be 1, specifies the number of data points a given cluster needs to have before it is identified as a new cluster. As this is an unsupervised method and does not require training on similar data, the DPMM is restarted from cluster 1 for each new tool. In the local DPMM results, the change of workpiece is indicated with dashed black vertical lines where the DPMM is reset to 1. The colour of the clusters are kept in the same order as the global DPMMs although the cluster initiation lines have not been shown for clarity.

The following analysis applies equally to the results of FIGS. 5 to 12 as it does to FIGS. 17 to 26. The results show how cluster identification can be used as a trigger to generate an alert, the alert being instructive as to the condition of the component.

In general, cluster 1 is usually the largest (discounting the effects of confounding influences), suggesting that the energy of AE harmonics does not vary enough to warrant a new cluster under the current hyperparameters. Physically, this could mean that the early wear progression of the tool does not significantly affect the harmonics of AE. In most cases, the energy of the harmonic frequencies increases rapidly near the end of tool life, due to tool wear. Owing to the large forces acting on the tool, small dislocations and micro cracks in the grain boundaries within the tool material release stress waves whilst also changing the wear profile of the tool. Consequently, the chip formation process may change permanently resulting in an increase in the energy of the AE signal. In the global DPMM, it is probable that these structural and conditional differences present themselves as non-Gaussian clusters, prompting the algorithm to separate into smaller Gaussians, leading to an increased number of clusters near the end of tool life.

Practically, the global cluster initiations could now be used as a warning of tool deterioration to the operator; where the appearance of a new cluster could be used to trigger an inspection rather than inspecting after a set sliding distance. The cluster initiations can therefore be considered as a novel method of setting a detection threshold. The observations from tool examination can be used to decide whether the tool is damaged beyond a pre-determined tolerance threshold or not. In the latter scenario, the new cluster can be treated as an undamaged state, thus allowing future classification of similar observations to the same cluster.

If, however, the cluster initiation occurs at the point of a workpiece change and tool measurement, the operator should refer to the local cluster initiations. In the case where the tool may be damage at the start of the pass owing to the impact with the workpiece, the local cluster is able to detect the corresponding variation in AE. In other words, the resetting of clusters at workpiece changes will essentially lead the local DPMM to only trigger new clusters when a significant change is seen in the data during machining of each workpiece. It can therefore be assumed that the changes are not due to anything other than tool wear (and associated effects such as increased temperature and force), as all the other operational influences are kept constant.

The results from hyperparameter tuning suggested that for this dataset, a small a value could be used as the clusters are well separated. This result may be beneficial because, practically, it is disadvantageous if man clusters are formed as cluster initiations are warnings for tool checks. If a large number of clusters are initiated, then the number of tool checks would also increase; which would reduce the time savings that can be achieved by the DPMM.

Some tools show that after initiations of new clusters, the data is sometimes grouped into a previous cluster. For example, after the third cluster initiation (represented as points of interest 11.1 and 23.1) at around 4 km for tool B3 in FIGS. 11 and 23, some data is still allocated to clusters 1 and 2 (data identified by points of interest 11.2 and 23.2 comprises data points the majority of which are classified into clusters 1 and 2). One explanation for this behaviour could be the changing cutting edge. As the tool traverses along the workpiece, it is constantly losing material from its cutting edge. It may be possible that some of the particles ejected from the tool are bigger than others, leading to a temporary hole in the cutting edge, causing the chip formation characteristics to change momentarily. Methods of the invention could implement a short delay before generating an alert, with analysis of the data points following the identification of a new cluster to determine what proportion of the following data points are determined to belong to the new cluster. A threshold proportion of data points belonging to a newly identified cluster may be introduced before an alert is generated.

As a result, the DPMM clusters the data into a new class. However, once the tool traverses along the workpiece after this event, it may be possible for the tool to smooth over the hole and return to an edge similar to earlier. At this point, the AE data would behave similarly to the previous cluster, resulting in the behaviours seen in the figures.

Another reason for the aforementioned clustering may be due to increased temperature at the cutting edge. In some cases, the produced chips can wrap themselves around the workpiece and gather at the cutting edge. In this case, the temperature at the cutting edge increases rapidly, burning the chips surrounding the tool. As a result, the chip formation characteristics may alter (and consequently, the generated AE) as the workpiece and tool temperatures affects the way the materials behave. This is one reason, among many, that temperature is another parameter of measurement from which cluster identification can be used to generate an alert.

The return of certain data points to an earlier cluster may be useful to an operator using the DPMM to monitor tools, as described above, and this information can also be useful for research and development purposes. This is especially true near the end of tool life where the data is clustered back to cluster 1 or 2 after tool failure, suggesting that the AE behave similarly to start of tool life. The reduced contact area between the tool and the workpiece may be a reason for this observation. To avoid unnecessary inspections due to confounding influences, it is possible to increase the threshold value so that a larger number of data points are required before initiating a new cluster. Therefore, not only are methods of the invention advantageous for increasing the time in use of a tool and reducing useful tool life left on tool decommissioning, but also for directing further research into component wear estimation.

However, the threshold value should be carefully considered as large values could mean that the cluster initiation is less sensitive to tool damage; the cluster will not be initiated until the threshold is met, in which time, the tool could be damaged catastrophically. An example of this can be seen in FIGS. 12 and 24 where global cluster 2 is initiated (marked on the Figures as points of interest 12.1 and 24.1, respectively), likely due to confounding influences: a change in workpiece. It can be seen that global cluster 2 initiates abruptly for all four features, F1 to F4. However, at this point, in the local DPMM, a second cluster is also immediately initiated suggesting that the data has been affected during the pass (marked on the Figures as points of interest 12.2 and 24.2). This cluster initiation may be due to the tool's interaction with the workpiece as it comes into cut, where the sudden contact has affected the tool's chip formation characteristics. The initiation of cluster 4 is most likely due to confounding influences (marked on the Figures as points of interest 12.3 and 24.3). Again, with global cluster 4, the significant and instantaneous change in acoustic emission causing initiation of the cluster implies a confounding influence Here, global clusters 3, 5 and 6 can be used as warnings to the operator to check for damage.

This method of parallel clustering is better suited to the tool damage detection problem than a two class approach such as outlier analysis for a number of reasons. When conducting outlier analysis, the data are assumed to be sampled from Gaussian distributions in order for Gaussian statistics to apply.

Any deviations from Gaussian distributions are seen as outliers indicative of abnormal data. As discussed previously, the DPMM is able to separate larger non-Gaussian clusters into smaller Gaussians clusters automatically, without the need to set the number of clusters a-priori, and therefore detect abnormal data time and again. By assigning data to multiple clusters, it is also possible to learn about the deterioration stages of the tool throughout time whilst also being robust against confounding influences. For example, the second cluster initiation of tools A2 and A3 and the fourth cluster initiation of tools B1 and B4 occur due to a large variation in AE energy compared to the previous data. From tool wear inspections, it is clear that these initiations were not caused by damage. By using the parallel DPMM method it should be possible to avoid operator intervention at these instances, whereas the same cannot be said for outlier analysis.

Given the lack of continuous wear measurements, it is difficult to directly validate that the DPMM is clustering at significant points. A means of partially assessing the success of the DPMM is in considering the trials where anomalies or irregularities were noted. In the next section, clustering of dissimilar tools are explored to investigate this further.

Clustering of Dissimilar Tools

Prediction of tool wear states for a tool dissimilar to others in the dataset can lead to low accuracies as the training set is not representative of the test set. As the DPMM does not require a training stage, the feasibility of detecting changes of AE for tools that behave dissimilarly to others is studied here.

Figure 13:
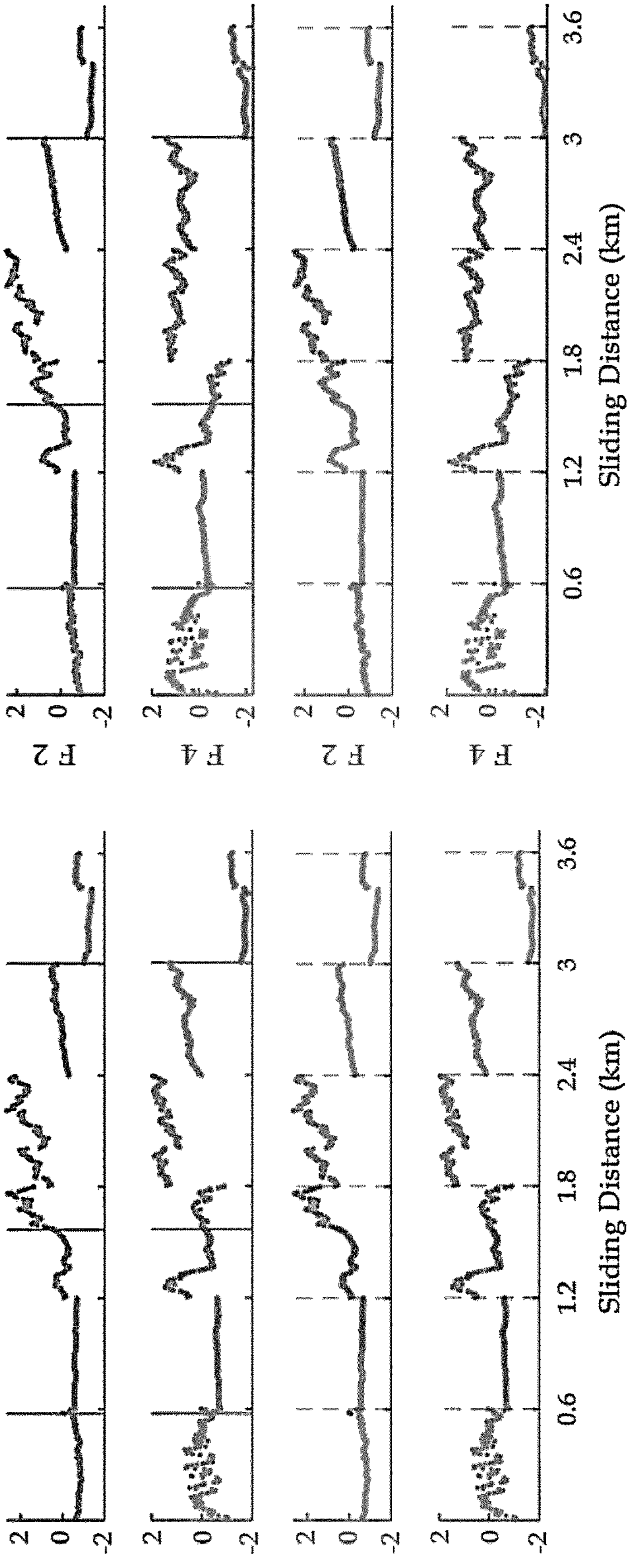
FIG. 13 depicts DPMM clustering results for a test tool, A5, using harmonics of the chip formation frequency from AE as input features.
Figure 14:
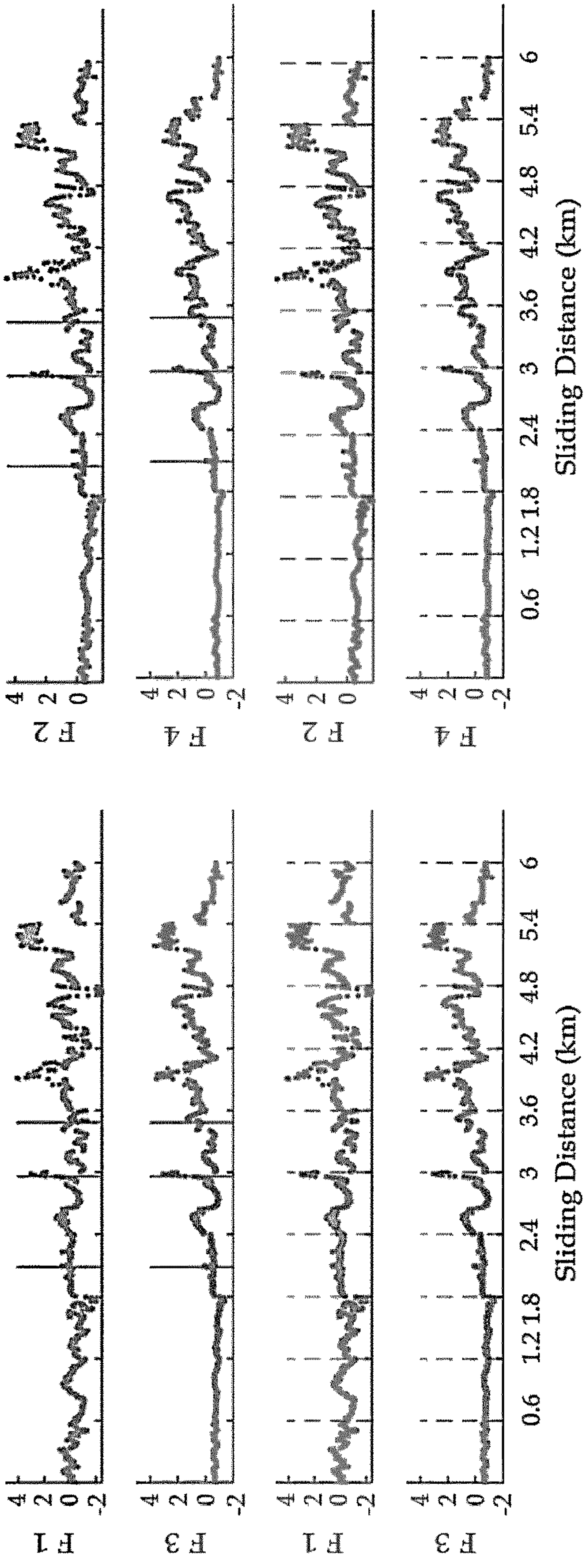
FIG. 14 depicts DPMM clustering results for a test tool, A5, using harmonics of the chip formation frequency from AE as input features.
Figure 25:
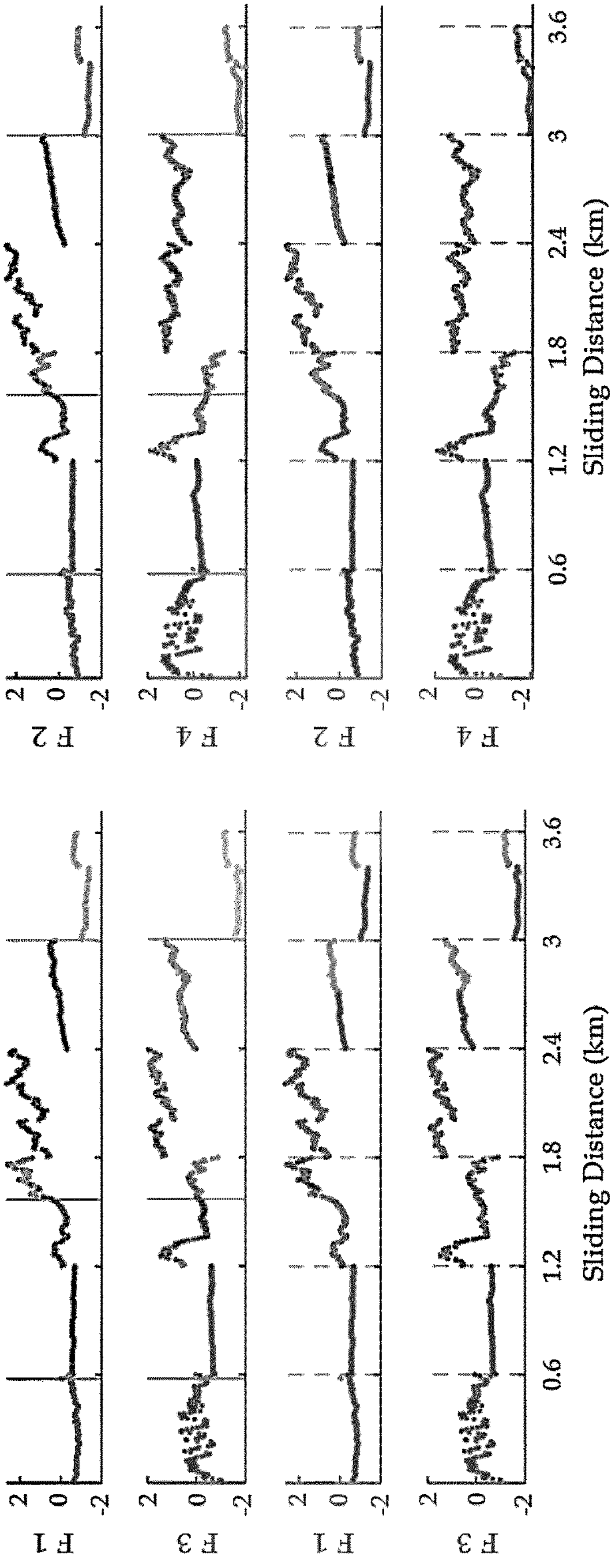
FIG. 25 depicts DPMM clustering results for a test tool, A5, using harmonics of the chip formation frequency from AE as input features.
Figure 26:
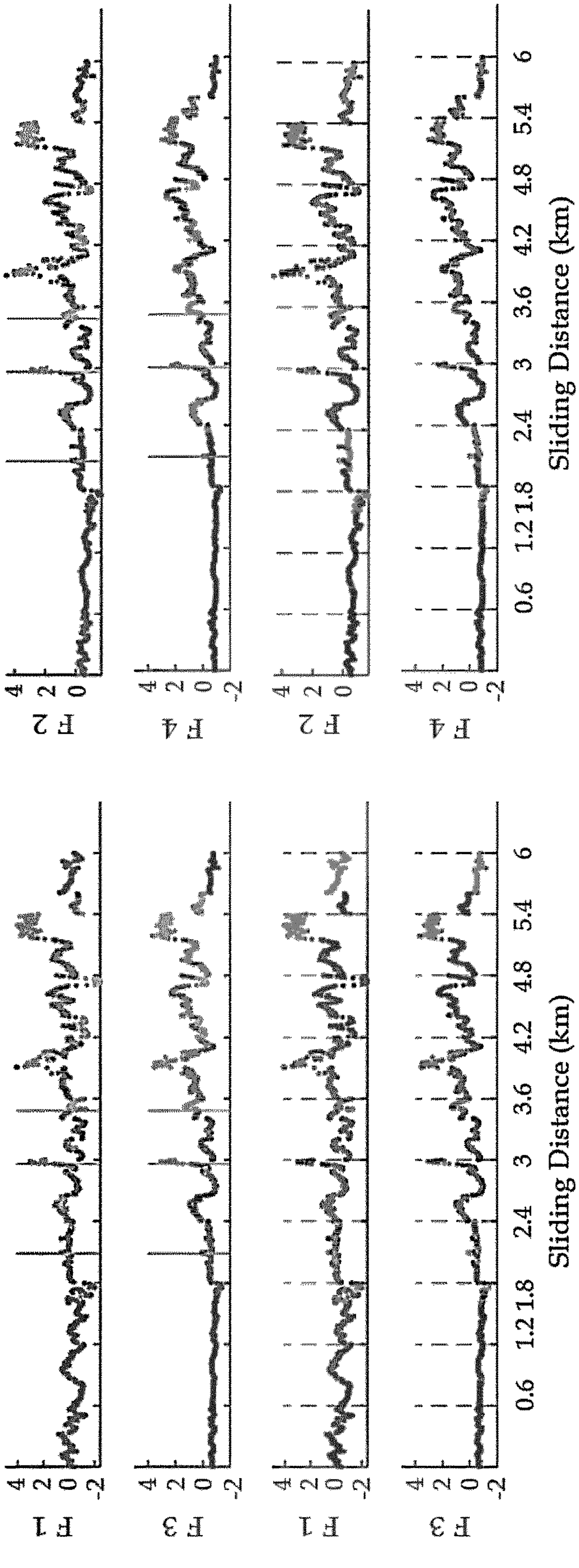
FIG. 26 depicts DPMM clustering results for a test tool, A5, using harmonics of the chip formation frequency from AE as input features.

FIGS. 13 and 14 show the results of the global and local DPMMs for tools A5 and B5 respectively, as do FIGS. 25 and 26. For comparison, the same features and hyperparameters are used for these tool as with all other tools within each grade. It is clear in both cases that the AE features behave differently to others in the dataset. It can be seen that the global DPMM detects cluster 3 at around 1.6 km and 3 km for tools A5 and B5 respectively, due to an unknown behaviour causing AE energy to rise at these specified frequencies. Due to this increasing energy in the middle of tool life, the global DPMM does not detect a new cluster around 2.7 km (A5) and 5.2 km (B5) even though the energy of the signal has increased comparative to the start of tool life. At this point, however, the local clustering has created a second cluster to reflect this energy increase, that could be used for intervention and avoid machining with a broken tool. As the DPMM does not rely on data from other tools for training, it is able to cluster dissimilar data in a way that machining with a damaged tool may be avoided still. It is clear that the DPMM is robust against a large range of tool behaviours, and suggests its appropriateness and Guidelines for Parallel DPMM to Avoid Tool Failure In order to correctly identify when a tool may be close to failure and to avoid false positives, guidelines for parallel DPMMs are suggested:

- The global clustering should take priority over local clustering, unless a global cluster has initialised at the point of a workpiece change. This is because the global clustering takes the entire dataset into account and as a result, it will be sensitive to large changes in the dataset. As the workpiece change can cause new clusters, the clusters at workpiece changes should be treated with caution.

If a global cluster has been initiated at the point of a workpiece change, and a local cluster gets initiated during that workpiece, the initiation of that local cluster should be used as a warning.

If a global cluster has been initiated at the point of a workpiece change, but no local clusters are initiated during the workpiece, the global cluster initiation should be ignored as a warning.

Modifying the DPMM Method as Applied to Tooling

A number of modifications can be made to the detailed embodiment described above. As mentioned previously, the method can be used for any component of machinery susceptible to wear, and any parameter can be measured and analysed. Furthermore, the method itself can be modified according to any of the steps detailed below.

As the DPMM does not rely on learning damage labels, the dataset can be any size. As larger datasets are more informative, the frequency at which the data arrives for clustering can be increased by taking averages of the AE data more often in the detailed example above, a data point represents a second of data which comprises 1 million raw AE data points. However, in alternative embodiments, each second of data could be represented by a much larger number of data points (i.e., a datapoint could represent a tenth of a second, increasing the amount of information inputted into the DPMM by tenfold), therefore producing a more informative trend or cloud of data for clustering. As more data becomes available, the DPMM may be able to initiate clusters earlier than currently as the clouds would be better defined with higher resolution, reducing the time taken for tool tests. It will be appreciated that the specific representations of the data points described above are not limiting, and an input data point may represent any number of seconds of measured data comprising any number of raw parameter measured data points; an appropriate number of seconds and raw parameter measured data points will depend on the component and parameter to be analysed. A selection of such an appropriate number of seconds or data points may be made by a person skilled in the art, and could be modified using preliminary testing and/or live results.

The number of frequency bins may be increased. By doing so, a higher frequency resolution may be achieved, perhaps leading to more features that increase in intensity close to tool failure. Four parameter bins (here, frequency) are proposed in the detailed embodiment as input or candidate features, but the number of input features may be between 1 and 100, between 2 and 50, between 3 and 25, and preferably, 4.

Here, the DPMM has been used as an unsupervised technique where data has been clustered without the need for target values. In the future, the DPMM could be used as a semi-supervised learning technique where damage labels could also be included in the model at the detection of change.

Interestingly in this work, the increase in AE energy (in the harmonics) leading to the final cluster initiation prior to failure usually occurs during the penultimate four passes of the workpiece. This information could be investigated further to build a system capable of prognosis; it may be possible to predict the remaining useful life of the tool by studying the nature of the final cluster initiation prior to catastrophic failure.

Transfer learning may also be applied to this dataset; in transfer learning clusters (along with known labels) are projected to a space that already contains clusters that are yet to be labelled. The idea is to minimise the distance between the cluster means. For the dataset collected here, inductive transfer learning could be applied, where the algorithm has information about the current cluster and requires a small amount of data from the new cluster to make judgements on similarity. However, it is not clear whether this method would be robust against tool breakage or tool wear.

Methods of the invention are compatible with a dedicated microscope that is capable of taking 3D images of the tool whilst still in the holder, negating the need to remove it. By doing so, it is possible to eliminate the positional change that acts as a confounding influence in this current dataset. The relative importance and necessity of parallel DPMMs would therefore be reduced, and a single DPMM could be accurately employed.

Furthermore, a set up such as this could be programmed with tool wear tolerances and thresholds that can be used to assess the tools at cluster initiations, negating the need for intervention by an operator, leading to completely online tool wear tests.

CONCLUSIONS

This work explores the idea of unsupervised learning where changes in monitoring data could be detected with incomplete damage label sets without the need for a training phase. DPMM and Gibbs sampling were used in this work to cluster AE data collected during a turning process. As this method may be considered as an infinite Gaussian mixture model, the number of clusters do not need to be set a-priori, leading to an entirely online implementation of the algorithm. By using unsupervised cluster initiations as warnings/prompts to the operator to conduct tool state investigation, the DPMM may be used successfully to reduce the time taken for measuring tools and provide a point at which tools can be retired. This method of using cluster initiations as a detection threshold has not been observed in past literature.

The input features for the models were taken from the frequency domain of acoustic emission signals which were measured throughout the entire life of the tool. The harmonics of chip formation frequencies energy were used as the input features as generally they were found to increase in intensity as a tool approaches failure.

Although throughout the detailed embodiments described herein, the clustering analysis used has been DPMM, it will be appreciated that alternative clustering analyses can be employed in order to achieve similar, effective, results. Alternative clustering algorithms capable of identifying clusters in data which relate to a state of component wear include, but are not limited to: affinity propagation, k-means clustering, mean shift, agglomerative clustering, and spectral clustering.

Time Savings Through Parallel DPMM

Due to the confounding influences that affect this dataset, a combination of global and local DPMMs running in parallel were implemented here for the first time in literature; the global DPMM sampled from the entire dataset collected during the life of the tool whereas the local DPMM only sampled from the data collected during each workpiece (at the points where the structure of the process changed). By using these parallel DPMMs, it could be possible to avoid machining with a broken tool whilst reducing the time spent on tool measurements. A complete list of time savings are presented in Table 1. Promising initial results showed that tool measurement time could be reduced significantly from 42% to 13.2% of average test times when using this method. Here, the results are also compared to a preventive maintenance strategy; in a preventative strategy the operator stops machining when the tool meets a pre-defined threshold (decided according to the machining operation)

The results presented in this work may be beneficial in industrial application for a number of reasons. Firstly, this method does not require training data that must encompass all operational conditions to safely predict on unseen tools. Secondly, it reduces the number of regular tool wear measurements that are conducted currently to only collecting damage labels when prompted by the algorithm. By running the DPMMs in parallel, the effect from confounding influences should be avoided. This method also works on AE features that can be used online without the need for preprocessing, such as dimensionality reduction. Furthermore, as the DPMM clusters according to changes in the features, it is possible to detect damage on tools with varying material compositions and also on tools that behave in a dissimilar manner to others. In conclusion, this method could be applied to any tool as long as the input features intensify when approaching tool failure. In fact, this method could be applied to any component of machinery and any input feature (i.e., measurable parameter) which varies as the component is used and wears.

TABLE 1

Summary of time savings when using DPMMs compared to other monitoring strategies. As the run-to-failure method leads to over 42% of test times on tool measurements, the DPMM leads to significant time savings.

| | Time spent on measurement (min) | | | % of time spent on measurement |
|---|---|---|---|---|
| Tool | Run-to-failure Tests | Preventative strategy | DPMMS | after applying DPMMs |
| A1 | 13.4 | 10.1 | 6.7 | 21.0 |
| A2 | 20.2 | 16.8 | 3.4 | 7.0 |
| A3 | 20.2 | 16.8 | 6.7 | 14.0 |
| A4 | 23.5 | 20.2 | 6.7 | 12.0 |
| B1 | 33.6 | 30.2 | 10.1 | 12.6 |
| B2 | 26.9 | 23.5 | 3.4 | 5.3 |
| B3 | 30.2 | 26.9 | 10.1 | 14.0 |
| B4 | 33.6 | 30.2 | 13.4 | 16.8 |
| Average | 25.2 | 21.8 | 7.6 | 13.2 |

Effect of Hyperparameters

In the examples presented herein, the hyperparameter $\alpha$ is fixed a-priori at 20; low values of a limits the number of clusters that are initiated. Tuning of the hyperparameter $\alpha$ and threshold values can be used to alter the number of samples in each cluster. In generic SHM cases, the presence of a crack is treated as damage and cross-validation can be used with false negative rates for checking misclassification of the DPMM, aiding the tuning of hyperparameter, $\alpha$. If the clusters are well separated, then the number of clusters generated is insensitive to the $\alpha$ parameter.

As the DPMM is used in this work to cluster data online, the value of $\alpha$ cannot be learned a-priori to find the optimum distribution. To understand the effect of the $\alpha$ parameter, the priori to find the optimum distribution. To understand the effect of the $\alpha$ parameter, the features used to obtain the result for tools A4 and B3 (in FIGS. 8 and 11 respectively) were fed through the algorithm for a number of $\alpha$ values. In each case, i.e., for each a value, the algorithm was repeated 100 times to obtain the average number of initiated clusters. The results have been presented using a box plot in FIG. 15. The average number of clusters across the 100 runs are shown with the red line, the outliers are shown in red crosses which stray beyond ±2.7σ (annotated by the whiskers). The top and the bottom of the boxes represent the 75th and 25th percentiles respectively.

Figure 15:
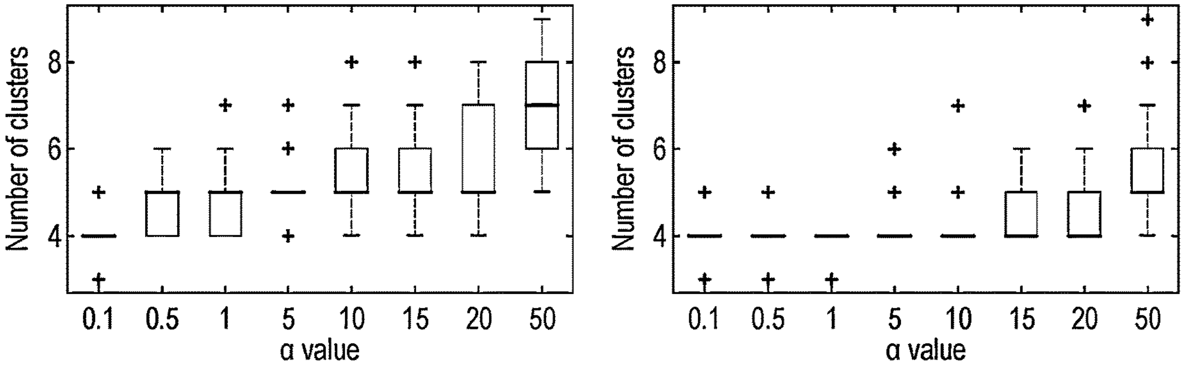
FIG. 15 depicts the number of clusters formed for a range of a values for two example tools (right—A4 and left—B3).

It is clear from FIG. 15 that the number of clusters are independent of the $\alpha$ value when $\alpha$ is small. This means that the clusters are well separated. When considering $\alpha$ values between 0.1 and 50, the mean number of clusters change very little. The recommendation here, therefore, is that any value of a between 1 and 50 can be used without significantly affecting the formation of number of clusters.

The window length of the Gibbs sampler could also affect the results of the DPMM. Though it is not a hyperparameter, it is a value that can impact the number of clusters and the points of cluster initiations. This is because the window length governs the number of data points that are re-evaluated by the algorithm. Practically, it is not useful to the operator if the Gibbs sampler re-evaluates a data point from an earlier sliding distance and reallocates it to a different cluster than the one it is in at that time.

However, the window length should be sufficiently large to ensure the Markov chain converges into the target distribution. Nevertheless, increasing the window length can reduce the computational speed so, again, engineering judgement should be used here to find a reasonable window length.

Example System

Figure 16:
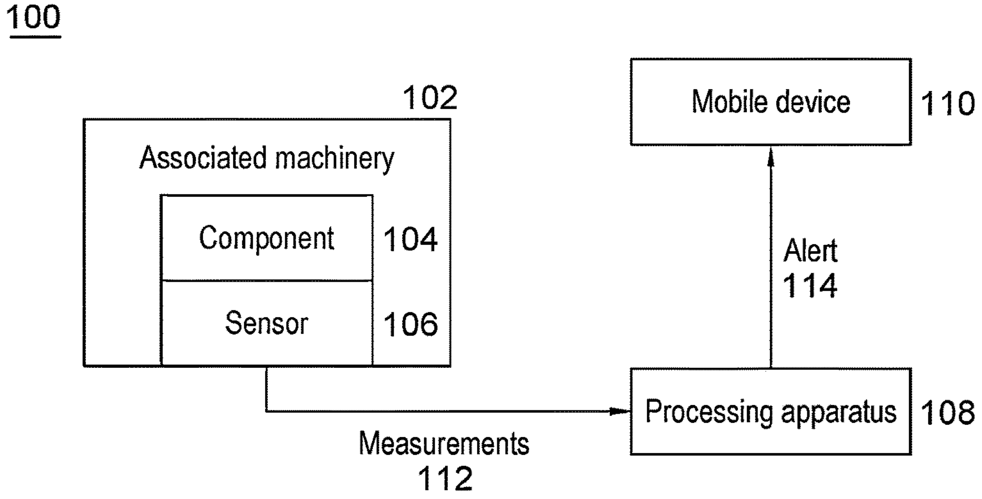
FIG. 16 depicts a system 100 according to an embodiment of the invention.
Figure 17:
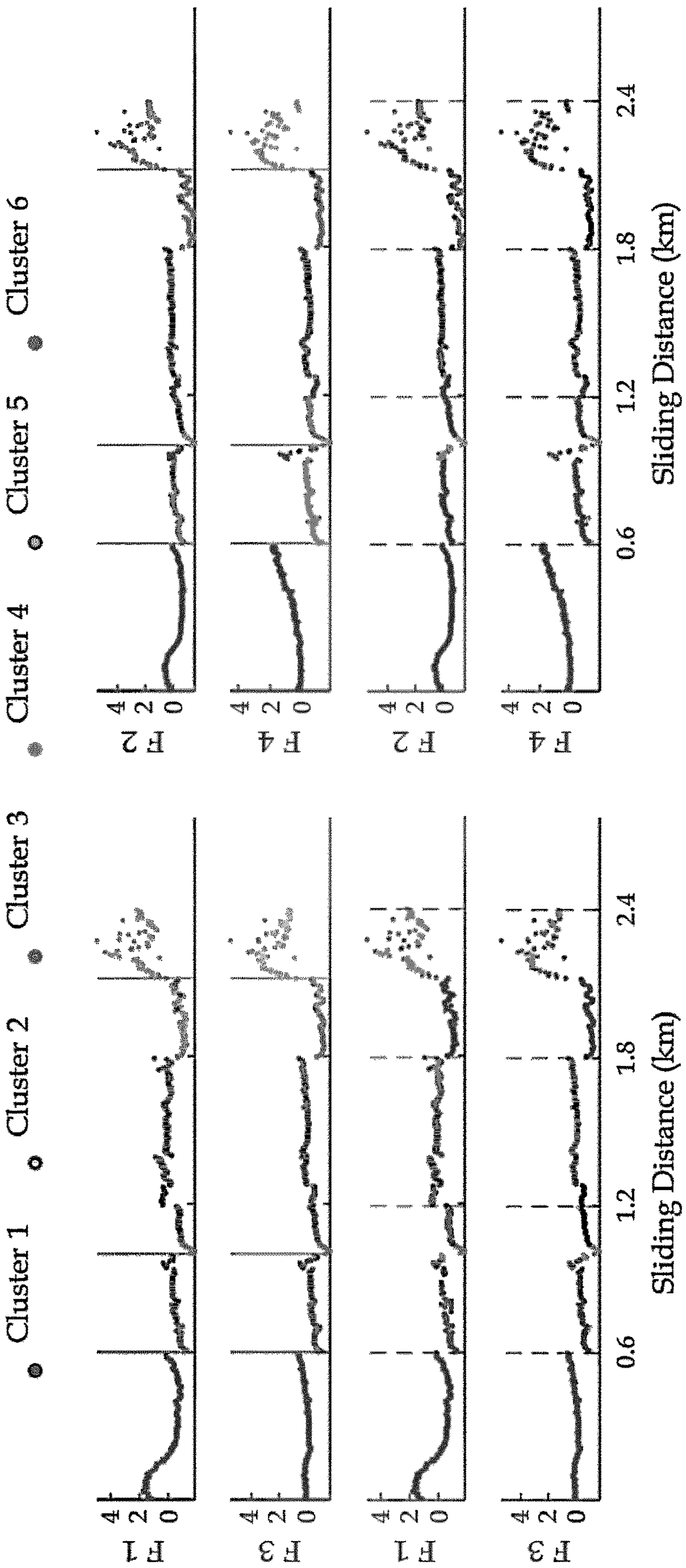
FIG. 17 depicts DPMM clustering results for a test tool, A1, using harmonics of the chip formation frequency from AE as input features.
Figure 18:
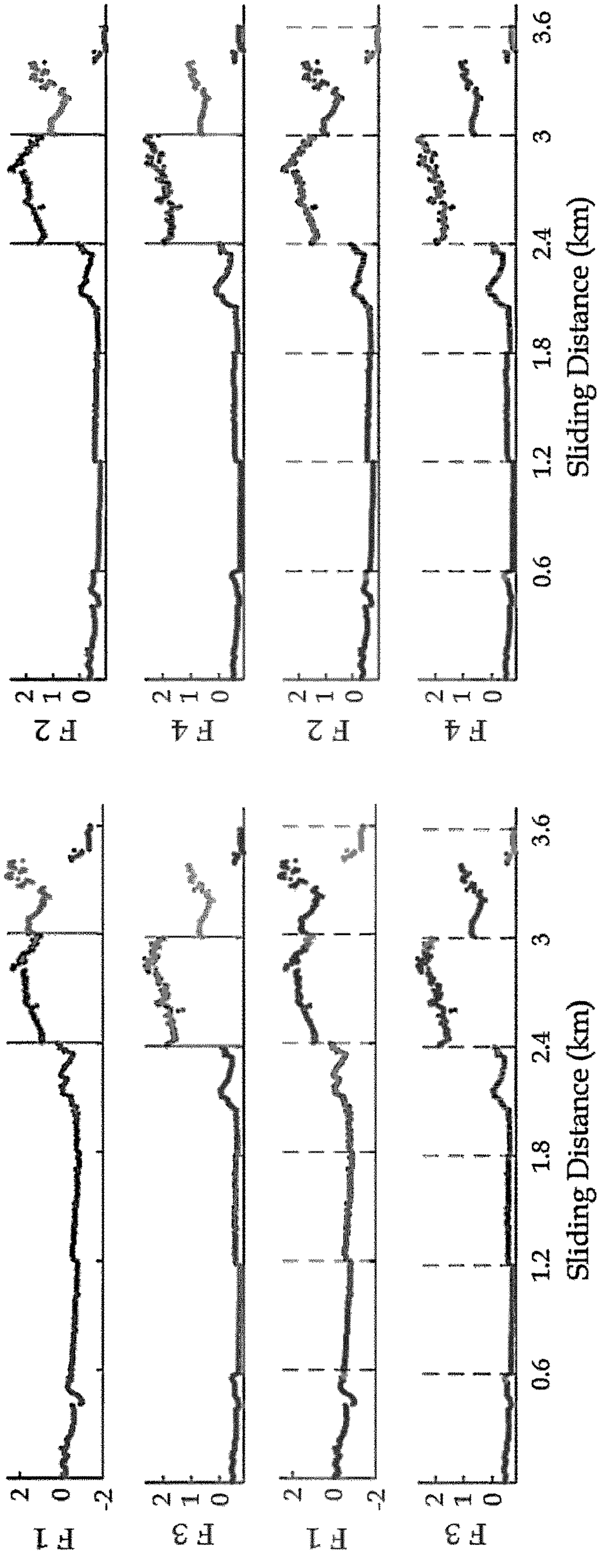
FIG. 18 depicts DPMM clustering results for a test tool, A2, using harmonics of the chip formation frequency from AE as input features.
Figure 19:
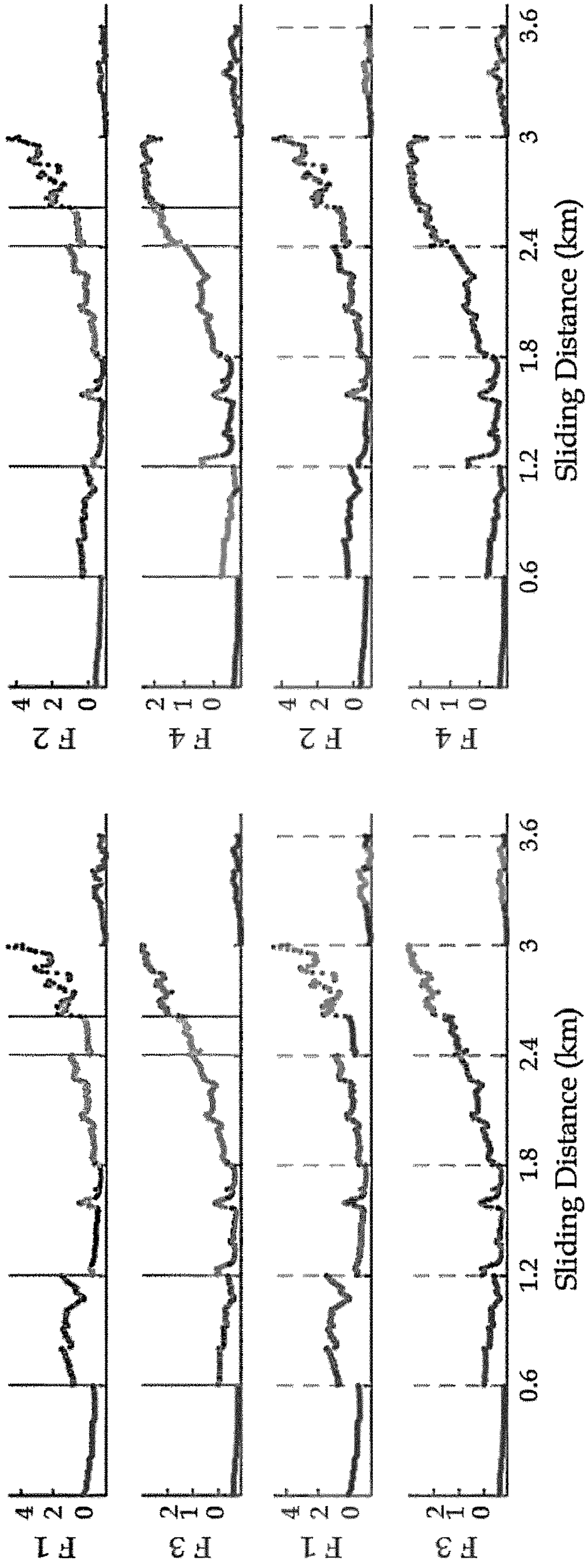
FIG. 19 depicts DPMM clustering results for a test tool, A3, using harmonics of the chip formation frequency from AE as input features.
Figure 20:
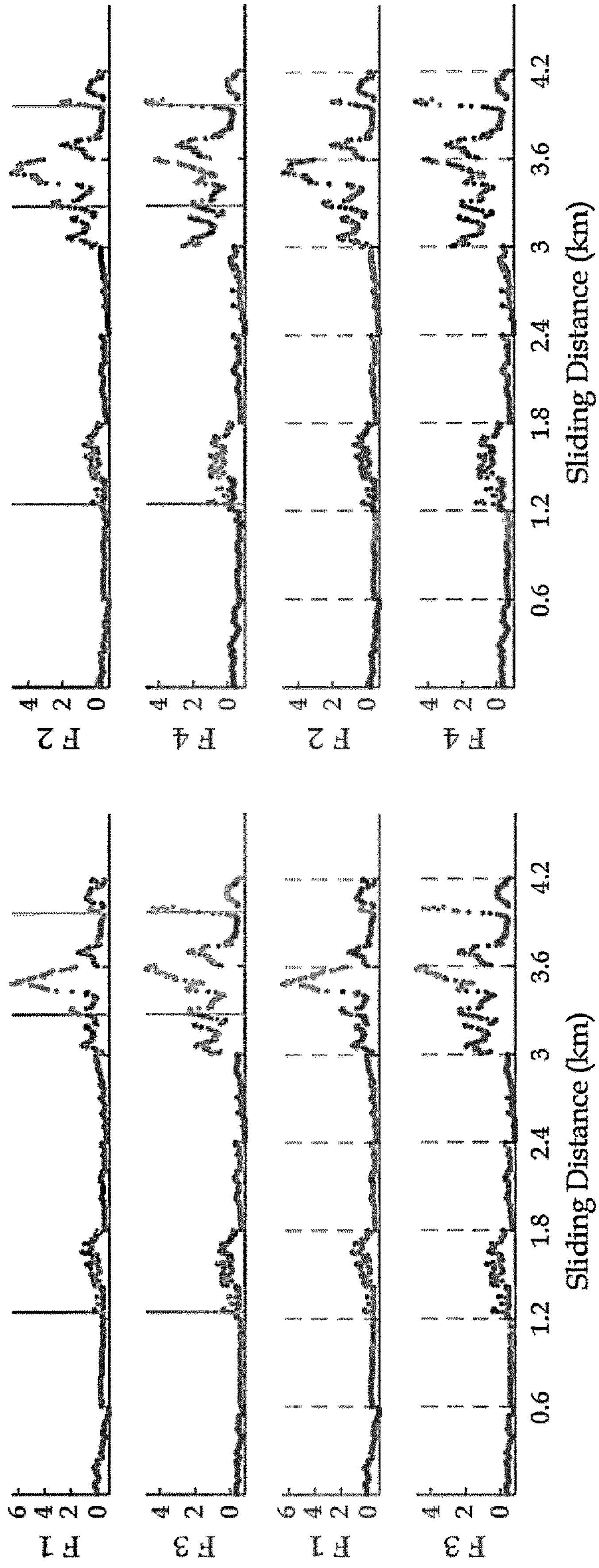
FIG. 20 depicts DPMM clustering results for a test tool, A4, using harmonics of the chip formation frequency from AE as input features.
Figure 21:
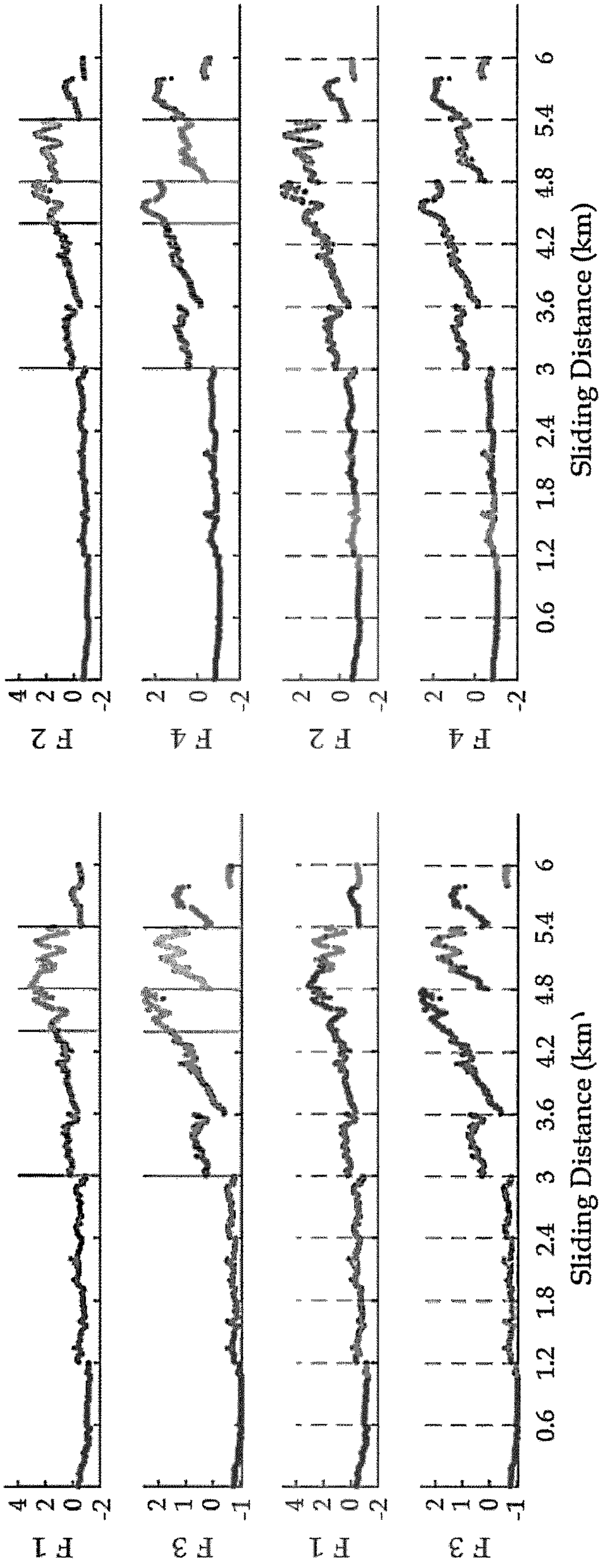
FIG. 21 depicts DPMM clustering results for a test tool, B1, using harmonics of the chip formation frequency from AE as input features.

FIG. 16 depicts a system 100 according to embodiments of the invention. System 100 comprises associated machinery 102, component 104, sensor 106, processing apparatus 108, and mobile device 110.

Associated machinery 102 is depicted as comprising component 104 and sensor 106, but this is exemplary only. Component 104 is removeable and replaceable; this is why it is advantageous to estimate its wear. Sensor 106 may be comprised within associated machinery 102 or may be additional and/or separate thereto. In some embodiments, component 104 comprises sensor 106. This may be advantageous when physical contact between component 104 and sensor 106 aids in measuring the relevant parameter during use of component 104 (for example, if the force applied by or to component 104 is to be measured). Sensor 106 may be a multi-purpose sensor configured to measure a number of different parameters during use of component 104, or may be a sensor dedicated to a single parameter, such as acoustic emission. The sensor 106 may be configured to measure the parameter of the component 104 indirectly, i.e., during, and without interfering with, use of the component 104.

Processing apparatus 108 is any computer processor suitable for performing the steps of the methods of the invention described herein. The processing apparatus 108 may be comprised within the associated machinery 102, have a wired connection thereto, or have a wireless connection thereto. In the embodiment depicted, processing apparatus 108 receives measurements 112 of $\alpha$ parameter of the component 104 in use, via a wireless connection from sensor 106. Wireless communications protocols suitable for such transmission will be apparent to a person skilled in the art. Furthermore, measurements 112 may be transmitted to the processing apparatus 108 via the internet.

The processing apparatus 108 performs at least one clustering analysis in accordance with embodiments of the invention. Measurements 112 may be received continuously from sensor 106 or may be received in one or more data packets. Data processing apparatus 108 performs one or more clustering analyses using the received measurements 112 and, upon identifying a new cluster in the measurements 112, generates an alert 114. The alert 114 may be processed by the data processing apparatus 108 itself, and may comprise one or more of computational instructions sent to the associated machinery 102 to cease operation and a recommendation for component inspection or replacement for review by a user. The data processing apparatus 108 may alternatively or additionally transmit the alert 114 to a third device, for example a mobile device 110, in order to be reviewed by a user. The data processing apparatus 108 may be comprised within the mobile device 110, or may be separate thereto, as depicted. Communication between the processing apparatus 108 and the mobile device 110 may be wired or wireless, as described in relation to communication between the sensor 106 and processing apparatus 108.

The invention claimed is:

1. A computer-implemented method for estimating component wear, comprising:

performing a first clustering analysis on a first plurality of measurements to identify one or more clusters in the first measurements, wherein the first measurements comprise measurements of $\alpha$ parameter of a component taken during use of the component;

generating a first alert when a new cluster is identified in the first measurements;

performing, in parallel with the first clustering analysis, a second clustering analysis on a second plurality of measurements to identify one or more clusters in the second measurements, wherein the second measurements comprise measurements of the parameter of the component, taken after the first alert has been generated and during further use of the component;

continuing the first clustering analysis on the first measurements, and introducing the second measurements from the second clustering analysis to the first clustering analysis, to identify one or more clusters in the combined first and second measurements; and generating a second alert when a new cluster is identified in the combined first and second measurements.

2. The method according to claim 1, further comprising:

generating a third alert when a new cluster is identified in the second measurements.

3. The method according to claim 1, wherein at least one of the first clustering analysis or the second clustering analysis is performed by an unsupervised machine learning algorithm.

4. The method according to claim 3, wherein the unsupervised machine learning algorithm does not pre-define a number of clusters to determine during the analysis.

5. The method according to claim 4, wherein the unsupervised machine learning algorithm is a Dirichlet process mixture model.

6. The method according to claim 1, wherein the alert is a recommendation to perform component inspection.

7. The method according to claim 1, wherein the parameter of the component is one or more of: a temperature of the component; a force on the component; and an acoustic emission from the component.

8. The method according to claim 7, wherein the parameter is an acoustic emission from the component, and wherein at least one of the first clustering analysis or the second clustering analysis uses a plurality of adjacent frequency ranges as candidate features.

9. The method according to claim 8, wherein the component is a machining tool.

10. The method according to claim 9, wherein each frequency range corresponds to a pre-determined harmonic of chip formation in the tool.

11. The method according to claim 10, wherein each frequency range is a 4 kHz interval.

12. The method according to claim 1, wherein the first clustering analysis is a global clustering analysis operating on measurements of the parameter of the component taken during operation of the component across a lifetime of the component.

13. The method according to claim 12, wherein the second clustering analysis is a local clustering analysis operating on the second measurements.

14. A method for inspecting component wear, comprising:

performing the computer-implemented method according to claim 1; and in response to an alert output from the computer-implemented method, inspecting the component for wear.

15. A data processing apparatus comprising means for carrying out the steps of the computer-implemented method of claim 1.

16. A non-transitory computer-readable storage medium comprising instructions which, when executed by a computer, cause the computer to carry out the steps of the computer-implemented method of claim 1.

* * * * *